United States Patent
Bailey

(10) Patent No.: US 7,138,793 B1
(45) Date of Patent: Nov. 21, 2006

(54) METHODS AND APPARATUS FOR DYNAMIC OFFSET ADJUSTMENT IN A MAGNETIC ARTICLE DETECTOR

(75) Inventor: James M. Bailey, Concord, NH (US)

(73) Assignee: Allegro Microsystems, Inc., Worcester, MA (US)

( * ) Notice: Subject to any disclaimer, the term of this patent is extended or adjusted under 35 U.S.C. 154(b) by 0 days.

(21) Appl. No.: 11/405,265

(22) Filed: Apr. 17, 2006

(51) Int. Cl.
*G01B 7/14* (2006.01)
*G01P 3/42* (2006.01)

(52) U.S. Cl. .................................. 324/207.12
(58) Field of Classification Search ............ 324/207.12
See application file for complete search history.

(56) References Cited

U.S. PATENT DOCUMENTS

| | | |
|---|---|---|
| 5,650,719 A | 7/1997 | Moody et al. |
| 5,917,320 A | 6/1999 | Scheller et al. |
| 6,232,768 B1 | 5/2001 | Moody et al. |
| 6,242,908 B1 | 6/2001 | Scheller et al. |
| 6,297,627 B1 | 10/2001 | Towne et al. |
| 6,525,531 B1 | 2/2003 | Forrest et al. |

OTHER PUBLICATIONS

Datasheet, ATS6421LSH, "Two-Wire True Zero Speed Miniature Differential Peak-Detecting Gear Tooth Sensor with Continuous Calibration", Allegro Microsystems, Inc., 16 pages.
Voisine, Cory, et al., U.S. Appl. No. 11/333,522 filed Jan. 17, 2000.

*Primary Examiner*—Bot LeDynh
(74) *Attorney, Agent, or Firm*—Daly, Crowley, Mofford and Durkee, LLP

(57) ABSTRACT

Apparatus and methods for detecting passing magnetic articles including an offset adjustment circuit for adjusting the DC level of the magnetic field signal based on a dynamically adjustable offset threshold signal. The detector includes a PDAC for tracking the positive peaks of a magnetic field signal and an NDAC for tracking the negative peaks of the magnetic field signal. In one embodiment, the offset threshold signal includes a positive offset threshold signal and a negative offset threshold signal that are initially set at fixed respective signal levels and that become the level of the PDAC signal and NDAC signals, respectively, in response to a counter, that counts a number of increments of the PDAC signal and decrements of the NDAC signal, reaching a predetermined count value.

12 Claims, 13 Drawing Sheets

METHODS AND APPARATUS FOR DYNAMIC OFFSET ADJUSTMENT IN A MAGNETIC ARTICLE DETECTOR

CROSS REFERENCE TO RELATED APPLICATIONS

Not Applicable.

STATEMENT REGARDING FEDERALLY SPONSORED RESEARCH

Not Applicable.

FIELD OF THE INVENTION

This invention relates generally to magnetic article detectors and, more particularly, to a magnetic article detector having a dynamic automatic offset adjustment circuit.

BACKGROUND OF THE INVENTION

Various types of magnetic field sensing elements or transducers are known, including Hall effect and magnetoresistive elements. Generally, sensors or detectors including magnetic field sensing elements provide an electrical signal representative of the sensed magnetic field and, in the presence of a moving ferromagnetic target object, the magnetic field signal is indicative of the shape or profile of the target object.

Magnetic field sensors are often used to detect gear features, such as gear teeth and/or gear slots. A magnetic field sensor in this application is commonly referred to as a "gear tooth" sensor. Gear tooth sensors are used in automotive applications to provide information to an engine control unit for ignition timing control, fuel management, and other operations.

In one type of gear tooth detector, the magnetic field signal is compared to a switching threshold signal to provide the detector output signal at a first binary level when the magnetic field signal is less than the switching threshold signal and at a second binary level when the magnetic field signal is less than the switching threshold signal. With this arrangement, the detector output signal transitions at the same point on each gear tooth. One such detector is described in U.S. Pat. No. 6,525,531 in which a Positive Digital-to-Analog Converter (PDAC) and a Negative Digital-to-Analog Converter (NDAC) track the positive and negative peaks of the magnetic field signal, respectively, for use in generating the switching threshold signal. This type of detector, in which the switching threshold signal is equal to a percentage of the peak-to-peak magnetic field signal, is sometime referred to as a peak-to-peak percentage detector.

Preferably, each detection of a particular feature of the passing magnetic article occurs at the same point on the magnetic field signal. A variation in the phase of detections of the same feature on different revolutions of the magnetic article or of different features on the same revolution is referred to as an error or jump in the phase of the detector output signal and can disadvantageously affect control units, such as engine control units in automotive applications, relying on the detector output signal.

Detection accuracy is adversely affected if the magnetic field signal experiences a change in magnetic offset. An offset shift can occur as a result of a changing spacing (or airgap) between the magnetic article and the magnetic field transducer, mechanical stresses, magnetic interference from nearby components or pollutants, and/or temperature variations. Changes in the amplitude or offset of the magnetic field signal degrade the accuracy of the magnetic article detection since the magnetic field signal is not centered within the dynamic range of the detector. In particular, accuracy is degraded when the magnetic field signal shifts so that the PDAC and NDAC signals no longer hold the true magnetic peak/valley. Since the switching threshold is a percentage of the difference between the PDAC and NDAC signals, the switching threshold will not align with the desired percentage point on the magnetic signal.

One technique for canceling an offset shift experienced by the magnetic field signal is to detect the presence of an offset shift greater than a predetermined amount and to adjust the level of the magnetic field signal accordingly, so as to cause the magnetic field signal to remain within the dynamic range of the detection and preferably, substantially centered within the dynamic range of the detector. However, under certain operating conditions, a significantly offset magnetic field signal having a relatively small peak-to-peak voltage may not cross the switching threshold signal, thereby causing a failure of the detector output signal to switch.

SUMMARY OF THE INVENTION

According to the invention, a magnetic article detector includes a magnetic field sensor providing a magnetic field signal proportional to an ambient magnetic field and an offset adjustment circuit responsive to the magnetic field signal for adjusting an offset of the magnetic field signal based on a dynamically adjustable offset threshold signal. The detector further includes a PDAC providing a PDAC signal that tracks positive peaks of the offset-adjusted signal and an NDAC providing an NDAC signal that tracks negative peaks of the offset-adjusted signal. A comparator responsive to the offset-adjusted signal and a switching threshold signal provides the detector output signal.

Also described is an update controller operative to increase the PDAC signal in response to increasing positive peaks of the offset-adjusted signal and to decrease the PDAC signal in response to a predetermined number of positive peaks of the offset-adjusted signal occurring that are less than a positive update threshold signal. The update controller is further operative to decrease the NDAC signal in response to decreasing negative peaks of the offset-adjusted signal and to increase the NDAC signal in response to a predetermined number of negative peaks of the offset-adjusted signal occurring that are greater than a negative update threshold signal.

The offset threshold signal is adjusted from a first, fixed level to a second level after an occurrence of a predetermined decrease in the PDAC signal or a predetermined increase in the NDAC signal. Preferably, the offset threshold signal comprises a positive offset threshold signal and a negative offset threshold signal and, when the offset threshold signal is at the second level, the positive offset threshold signal is substantially equal to the PDAC signal and the negative offset threshold signal is substantially equal to the NDAC signal.

With this arrangement, the offset-adjusted signal is clamped to a lower level than the fixed offset threshold levels, thereby ensuring that the detector output signal will switch even under conditions of relatively low magnetic field signal magnitude and significant offset shifts.

An optional second update controller is operative to increase the PDAC signal in response to increasing positive peaks of the offset-adjusted signal and to decrease the PDAC signal to the level of the offset-adjusted signal in response to transitions of the detector output signal of a first polarity. The second update controller is further operative to decrease the NDAC signal in response to decreasing negative peaks of the offset-adjusted signal and to increase the NDAC signal to the level of the offset-adjusted signal in response to transitions of the detector output signal of a second, opposite polarity. In one embodiment, the second update controller controls the PDAC and NDAC for a time interval following an adjustment of the offset threshold signal. With this arrangement, the second update controller, with which the PDAC and NDAC signals acquire the positive and negative peaks of the magnetic field signal faster, controls the PDAC and NDAC signals for a time following the adjustment of the offset threshold signal.

Also described is a method for detecting passing magnetic articles including adjusting a DC offset of a magnetic field sensor signal based on a dynamically adjustable offset threshold signal to provide an offset-adjusted signal. The method further includes generating a PDAC signal that tracks positive peaks of the offset-adjusted signal, generating an NDAC signal that tracks negative peaks of the offset-adjusted signal, providing a switching threshold signal as a percentage of the difference between the PDAC signal and the NDAC signal, and comparing the switching threshold signal to the offset-adjusted signal to provide the detector output signal.

BRIEF DESCRIPTION OF THE DRAWINGS

The foregoing features of the invention, as well as the invention itself may be more fully understood from the following detailed description of the drawings, in which.

DETAILED DESCRIPTION OF THE INVENTION

Figure 1:
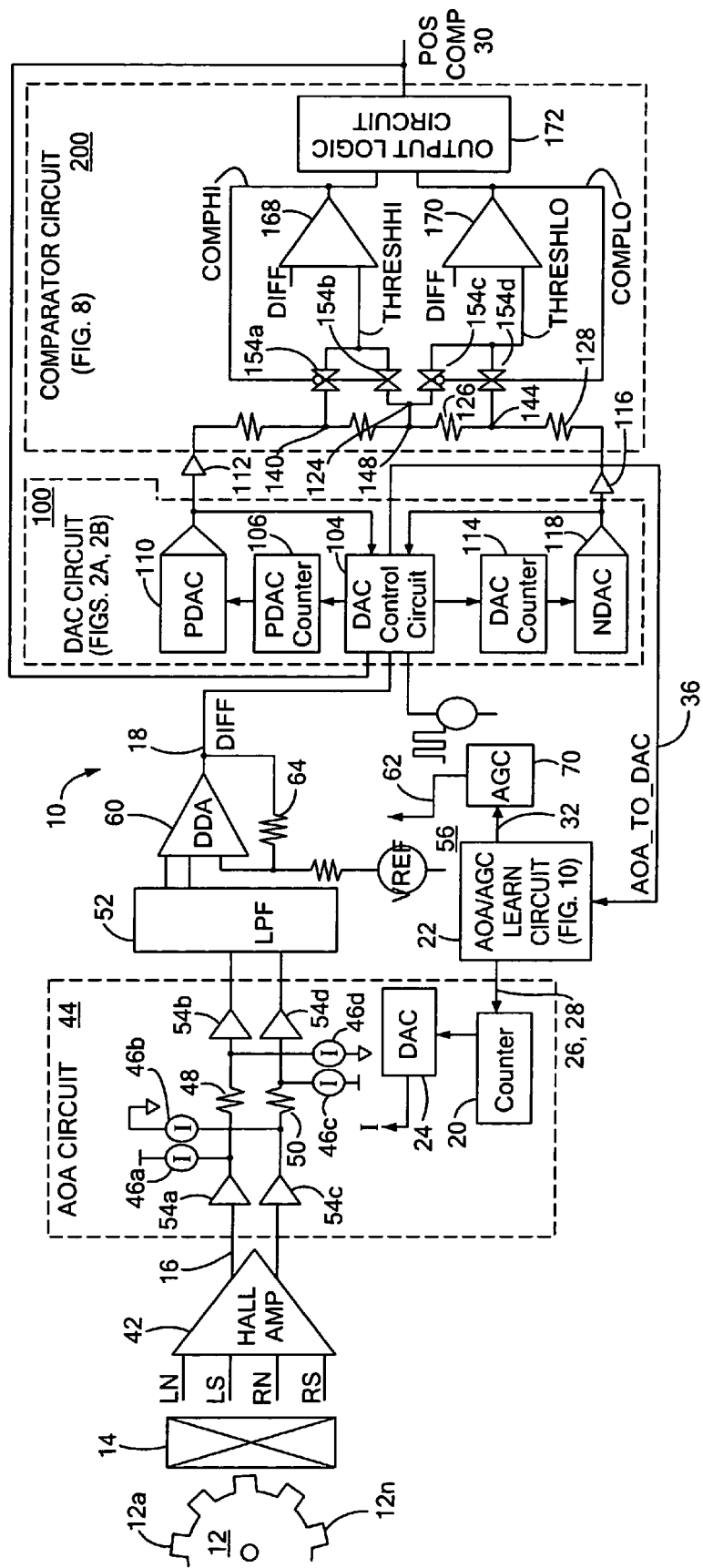
FIG. 1 is a simplified block diagram of a detector circuit for detecting passing magnetic articles according to the invention.

Referring to FIG. 1, a magnetic article detector 10 includes a magnetic field sensing element 14 providing a signal that is proportional to an ambient magnetic field. The detector 10 is positioned in proximity to a magnetic article, for example a gear 12, so that the output signal of the sensing element 14 is indicative of the profile of the magnetic article 12. The detector 10 provides a detector output signal, POSCOMP, 30 indicative of the magnetic article 12 as it passes through the ambient magnetic field and here, a pulse train having transitions indicating edges of the gear teeth 12a–12n.

The magnetic field sensing element 14 may take various forms known in the art, including but not limited to a Hall effect element, a vertical Hall effect element, a Giant Magnetoresistive (GMR) element, an Anisotropic Magnetoresistive (AMR) element, and a Tunnel Magnetoresistive (TMR) element. Also, the magnetic field sensing element 14 may comprise a single magnetically responsive element or, alternatively, may comprise a plurality of elements arranged in various configurations. In the illustrative embodiment, the magnetic field sensing element 14 is comprised of two Hall effect elements physically offset from one another to provide output signals that are subtracted, thereby improving the signal to noise ratio of the resulting magnetic field signal.

The signal from the Hall effect element 14 is amplified by a Hall amplifier 42. The output of the amplifier 42 is referred to herein as the magnetic field sensor signal 16 or simply the magnetic field signal and is coupled to an Automatic Offset Adjustment (AOA) circuit 44 for offset cancellation. The AOA circuit 44 includes current sources 46a, 46b, 46c, 46d, arranged to provide a positive or negative current, I, flow through resistors 48, 50, as shown, thereby adjusting the DC level of the amplified magnetic field signal accordingly. If the magnitude of the magnetic field signal is as large as the dynamic range of the detector 10, then the AOA circuit 44 centers the magnetic field signal within the voltage rails of the detector. Whereas, if the magnetic field signal magnitude is smaller than the dynamic range, then the magnetic field signal will be within the voltage rails, but not necessarily centered within the dynamic range. Buffers 54a and 54c are coupled between each resistor 48, 50 and the amplifier 42 and buffers 54b, 54d are coupled between each resistor 48, 50 and a low pass filter 52, as shown.

The level of current I, and therefore the offset shift introduced by the AOA circuit 44 is established by a counter 20 and an AOA Digital-to-Analog Converter (DAC) 24. The AOA DAC 24 converts the counter output into an analog signal that controls the level of the current I. Thus, it can be said that the current I and the resulting offset introduced by the AOA circuit 44 are determined by the counter 20.

In a conventional AOA circuit, a comparator compares a DIFF signal 18 (which is an amplified, AOA-adjusted, filtered, and gain-adjusted version of the magnetic field signal 16, as described below, and as herein referred to alternatively as an offset-adjusted signal) to fixed, predetermined positive and negative offset threshold signals and, when the DIFF signal exceeds either such signal level, a counter (like counter 20) is enabled, thereby moving the magnetic field signal to within the offset threshold signal levels.

In contrast, according to the present invention, the counter 20 is operated in a different manner in order to eliminate the detector failure mode described above, in which a DIFF signal having a relatively small peak-to-peak voltage that is subjected to a significant offset shift fails to cross the switching threshold signal, thereby causing the detector output signal to stop switching.

As will be described in detail below, in the present detector 10, an offset threshold signal, comprising a positive offset threshold signal and a negative offset threshold signal that establish the offset introduced by circuit 44, is dynamically adjustable. More particularly, after a predetermined number of increments or decrements of a PDAC counter 106 or an NDAC counter 114 (meaning that the DIFF signal has exceeded the PDAC or NDAC signal level by a predetermined voltage threshold level and thus that a predetermined increase in the PDAC signal or decrease in the NDAC signal has occurred), the positive and negative offset threshold signals are switched from respective fixed levels to the level of the PDAC and NDAC signals, respectively. Also after the DIFF signal has exceeded the PDAC or NDAC signal level by the predetermined voltage threshold level, the DIFF signal is clamped to its present level. The predetermined number of increments or decrements of a PDAC counter 106 or an NDAC counter 114 is established by counters 216, 218 within a DAC control circuit 104 shown in FIG. 2A reaching a predetermined count value. When the predetermined count value is reached, a flag signal 36, AOA_TO_DAC, is set thereby enabling the counter 20 within the AOA circuit 44 according to logic within an AOA/AGC learn circuit 22. The AOA_TO_DAC signal 36 being set is referred to herein as an AOA_TO_DAC event. Dynamically adjusting the offset threshold signal levels to become the PDAC/NDAC signal levels in this manner causes the DIFF signal to be clamped to its present level, thereby keeping the PDAC and NDAC signals at levels suitable to ensure that the detector output signal 30 will switch even under conditions of relatively low magnetic field signal magnitude and significant offset shift. The DAC control circuit 104 is shown and described in conjunction with FIGS. 2A and 2B and the AOA/AGC learn circuit 22 is shown and described in conjunction with FIG. 10. Before discussing details of the DAC control circuit 104 and the AOA/AGC learn circuit 22 in controlling the AOA circuit 44, further aspects of the detector 10 will be described.

The output signal of low pass filter 52 is coupled to an Automatic Gain Control (AGC) circuit 56 that adjusts the gain of the filter output signal to provide the DIFF signal 18. In larger airgap installations, the magnetic field sensor signal 16 has a lower magnitude than in smaller airgap installations. It is generally advantageous to "normalize" the size of the magnetic field sensor signal 16 for further processing and detection. To this end, the AGC circuit 56 includes a dual differential amplifier (DDA) 60 that is responsive to the output of the low pass filter 52 and to an adjustable resistive feedback element 64, as shown. The feedback element 64 is adjustable in response to an AGC counter 70. Various schemes are possible for controlling the counter 70 to provide automatic gain control functionality. One illustrative scheme is shown and described in connection with FIG. 10.

In the illustrative embodiment, the AGC circuit 56 is active only during a calibration mode of operation of the detector 10. More particularly, the illustrative detector has three modes of operation: a start up mode that begins when power is applied to the detector and lasts until the AOA circuit 44 centers the DIFF signal at a voltage level of Vreg/2 (FIG. 10); a calibration mode that begins at the end of the start up mode and lasts until a predetermined number of gear teeth pass the magnetic field sensing element as established by a CNTX_LAT signal (FIG. 10); and a running mode that begins at the end of the calibration mode and lasts until the detector is powered down or is reset. More particularly, the start up mode lasts until the DIFF signal crosses the Vreg/2 voltage level or the AOA counter 20 reaches its maximum or minimum count.

The AOA circuit 44 is active during all modes of detector operation. In particular, the AOA circuit 44 is operative to center the DIFF signal at the Vreg/2 voltage level during the start up mode of operation. The AOA circuit is active to maintain the DIFF signal to within fixed offset threshold levels during the calibration mode of operation. And finally, the AOA circuit is operative to maintain the DIFF signal to within wider, fixed threshold levels during normal operation in the running mode. That is, during normal running mode operation, the offset threshold signal levels are relaxed to provide a wider voltage range in which the magnetic field signal may dwell. According to the invention, the AOA circuit additionally operates, during the running mode, in the above-described manner (and as described further below) to dynamically adjust the offset threshold levels to the PDAC and NDAC signal levels and to thereby clamp the DIFF signal to its present level in response to significant offset shifts. The AGC circuit is active only during the calibration mode of operation.

As is known, the use of differential elements and differential signals can be advantageous for common mode noise reduction reasons. In the illustrative embodiment, the elements and signals before the AGC circuit 56 are differential and, after the gain stage 56, the elements and signals, such as the DIFF signal 18, are single ended, as shown. It will be appreciated by those of ordinary skill in the art however that such design choices are based on particular circuit specifications and can be readily varied to meet different requirements.

The DIFF signal 18 is applied to a DAC circuit 100, as shown. The DAC circuit 100 includes a DAC control circuit 104, a PDAC counter 106, a PDAC 110 that provides a PDAC signal 130 that tracks the positive peaks of the DIFF signal, an NDAC counter 114, and an NDAC 118 that provides an NDAC signal 134 that tracks the negative peaks (i.e., valleys) of the DIFF signal. Details of the DAC circuit 100 are shown and described in conjunction with FIGS. 2A and 2B.

The PDAC signal 130 and the NDAC signal 134 are updated in an effort to closely track the DIFF signal peaks and valleys, without causing excessive update events, as may result in jitter and/or detection errors. As will be shown and described in conjunction with FIGS. 2A and 2B, here, two different update schemes are provided for use under different operating conditions.

The PDAC signal 130 and the NDAC signal 134 are coupled, through respective buffers 112 and 116, to a comparator circuit 200, as shown. The comparator circuit 200 includes a first comparator 168 for comparing the DIFF signal 18 to a first switching threshold signal, THRESHHI, to provide a COMPHI output signal and also includes a second comparator 170 for comparing the DIFF signal to a second switching threshold signal, THRESHLO, to provide a COMPLO output signal.

More particularly, the PDAC and NDAC signals are coupled to a resistor divider comprising series-coupled resistors 122, 124, 126, and 128 in order to generate switching threshold signals, THRESHHI and THRESHLO. Each of the switching threshold signals THRESHHI and THRESHLO is a percentage of the difference between the PDAC and NDAC voltages or, in other words, a percentage of the peak-to-peak DIFF signal 18.

As will be described further in conjunction with FIGS. 8 and 9, in the illustrative embodiment, the detector 10 is provided with hysteresis by using threshold signals THRESHHI and THRESHLO at one of three different threshold signal levels, depending on whether certain threshold criteria are met. The three different threshold signal levels correspond to three different percentages of the peak-to-peak DIFF signal, as established by signals 140, 148, and 144 at circuit nodes between resistors 122 and 124, resistors 124 and 126, and resistors 126 and 128, respectively.

An output logic circuit 172 is responsive to the COMPHI and to the COMPLO signals to provide the POSCOMP detector signal 30. The output logic circuit 172 is shown and described further in conjunction with FIG. 8.

Figure 2A:
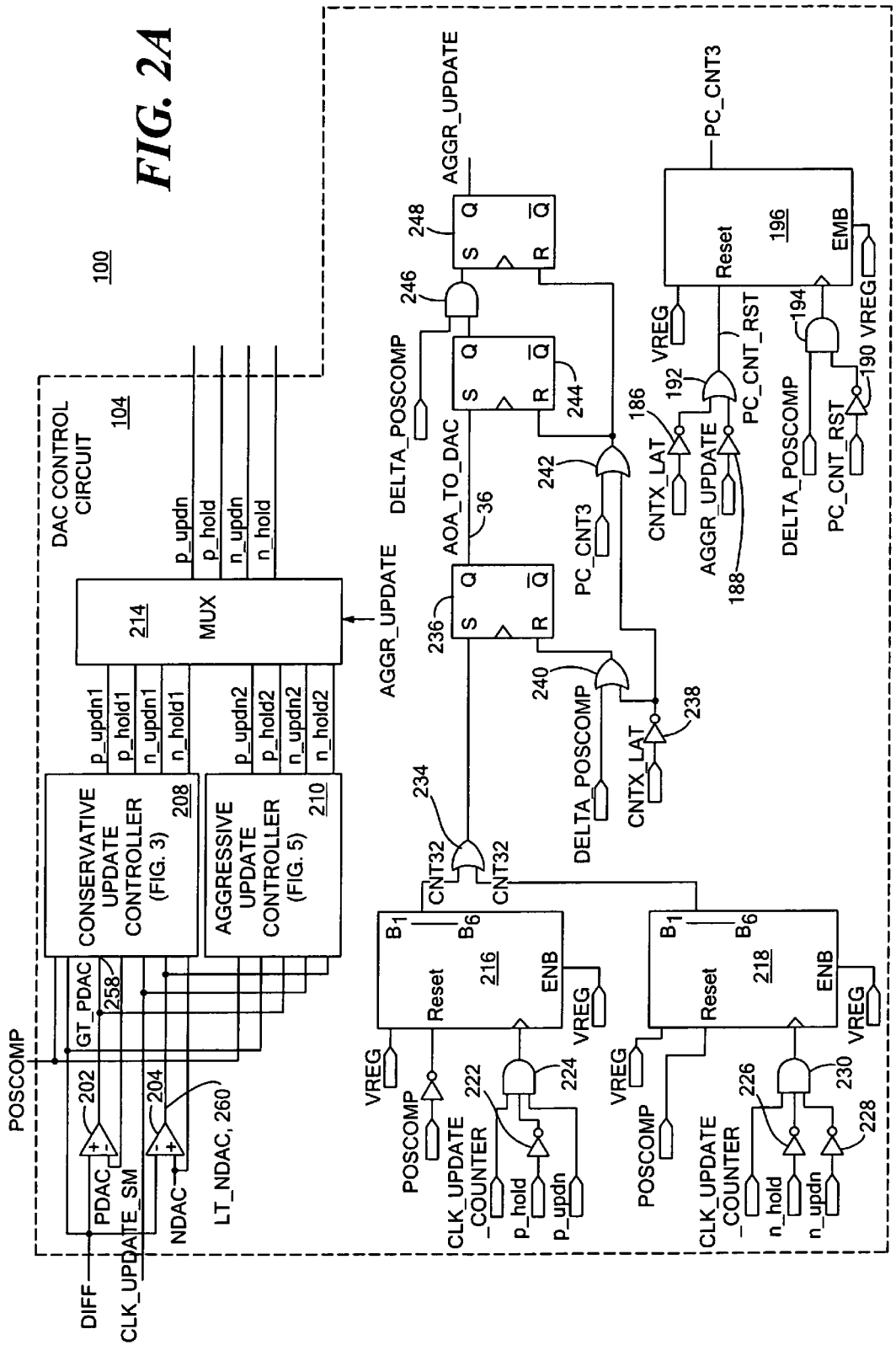
FIGS. 2A and 2B are a block diagram of the DAC control circuit of FIG. 1.
Figure 2B:
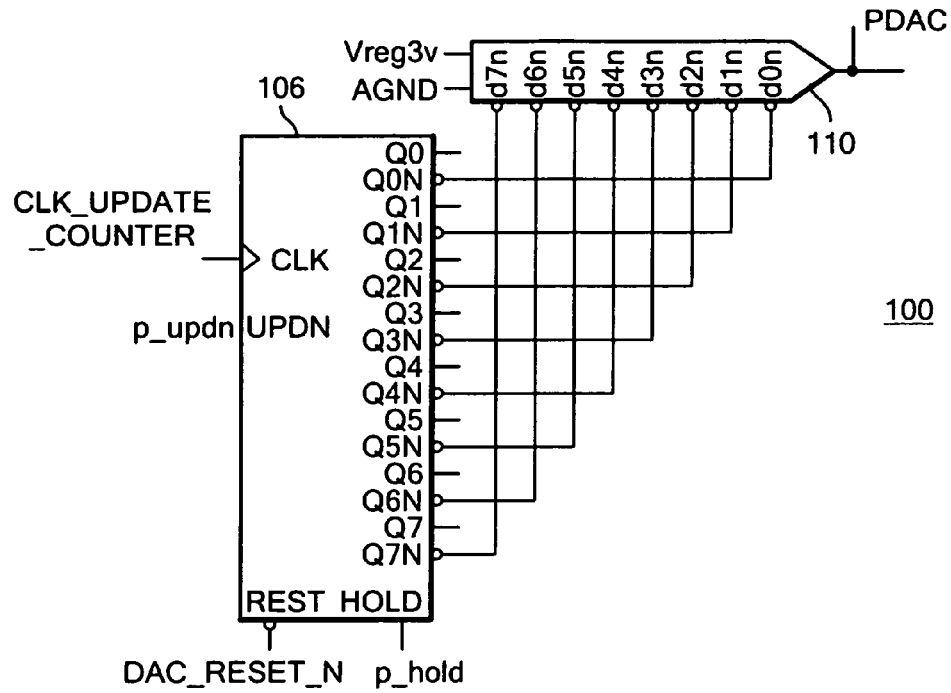

Referring also to FIGS. 2A and 2B, the DAC circuit 100 is shown in greater detail to include the DAC control circuit 104, the PDAC counter 106, the PDAC 110, the NDAC counter 114, and the NDAC 118. In the illustrated embodiment, each of the elements 106, 110, 114, and 118 is an 8-bit device.

The DAC control circuit 104 includes a first comparator 202 and a second comparator 204, both having inputs responsive to the DIFF signal 18, as shown. More particularly, the first comparator 202 has a non-inverting input coupled to the DIFF signal 18 and an inverting input coupled to the PDAC signal 130 and the second comparator 204 has an inverting input coupled to the DIFF signal 18 and a non-inverting input coupled to the NDAC signal 134. The output signals of comparators 202 and 204 provide input signals GT_PDAC 258 and LT_NDAC 260, respectively, to the update controllers 208, 210, as shown.

As noted above, the PDAC signal 130 and the NDAC signal 134 are updated in order to closely track the positive and negative peaks of the DIFF signal. By doing so, the switching threshold signal levels 140, 144, and 148 (FIG. 1) are concomitantly updated so as to remain at a desired percentage of the peak-to-peak DIFF signal regardless of variations in the DIFF signal. The update controller 208 (here referred to as a conservative update controller) serves this purpose by implementing a scheme in which updating on peak-to-peak DIFF signal changes of decreasing magnitude (i.e., "inward" updating) is limited to reduce or eliminate unneeded update events, as will be described further in connection with FIGS. 3A, 3B and 4.

According to a further, optional aspect of the invention, a second update controller 210 (here referred to as an aggressive update controller) is provided for use to update the PDAC and NDAC signals under certain operating conditions. Suffice it to say here that the update controller 210 implements a scheme in which, upon each transition of the POSCOMP signal 30, one of the PDAC and NDAC signals is updated, or reset to the level of the DIFF signal, following which the updated one of the PDAC and NDAC signals is allowed to follow the DIFF signal up to the next positive peak or down to the next negative peak, as will be described below in connection with FIGS. 5–7 and as is also described in the above-referenced U.S. Pat. No. 6,525,531.

Under "normal" operating conditions, the conservative update controller 208 governs operation of the PDAC 110 and NDAC 118. The aggressive update controller 210 governs operation of the PDAC 110 and NDAC 118 for an interval corresponding to a predetermined number of gear teeth passing the detector following the occurrence of an AOA_TO_DAC event. This allows the PDAC and NDAC signals to re-acquire the true magnetic peak/valley and restore accuracy the accuracy of the detector output signal more quickly after an offset shift.

Each of the update controllers 208, 210 provides respective control signals for controlling the PDAC counter 106 and the NDAC counter 114. Specifically, the conservative update controller 208 provides a p_updn1 signal to control the direction of the count by the PDAC counter 106, a p_hold1 signal to control whether the counter 106 is enabled or held, an n_updn1 signal to control the direction of the count by the NDAC counter 114 and an n_hold1 signal to control whether the counter 114 is enabled or held. Similarly, aggressive update controller 210 provides a p_updn2 signal to control the direction of the count by the PDAC counter 106, a p_hold2 signal to control whether the counter 106 is enabled or held, an n_updn2 signal to control the direction of the count by the NDAC counter 114, and an n_hold2 signal to control whether the counter 114 is enabled or held. The output signals from the update controllers 208, 210 are coupled to a multiplexer 214, as shown, which, under the control of an AGGR_UPDATE signal determines whether the output signals from the conservative update controller 208 or from the aggressive update controller 210 govern operation of the PDAC 110 and NDAC 118 by providing control signals p_updn, p_hold, n_updn, and n_hold to the PDAC counter 106 and the NDAC counter 114, respectively. The p_updn signal controls the direction of the count by the PDAC counter 106, the p_hold signal controls whether the counter 106 is enabled or held, the n_updn signal controls the direction of the count by the NDAC counter 114, and the n_hold signal controls whether the counter 114 is enabled or held.

More particularly, the p_hold signal is coupled to a HOLD input of the counter 106. The counter output is held constant (i.e., the counter is disabled) when the HOLD input signal is at a first logic level and is released (i.e., the counter is enabled) when the HOLD input signal is at the second logic level. In the illustrative embodiment, the counter 106 is an eight bit counter which is enabled when the HOLD input is low. The counter 106 counts up when the p_updn signal is at a logic high level. The counter 106 is reset by a DAC_RESET_N signal in response to the AGC circuit 56 such that the counter is reset whenever the AGC counter 70 (FIG. 1) makes a step and whenever the AOA counter 20 (FIG. 1) makes a step. The n_hold signal is coupled to a HOLD input of the counter 114. The counter output is held constant (i.e., the counter is disabled) when the HOLD input signal is at a first logic level and is released (i.e., the counter is enabled) when the HOLD input signal is at the second logic level. In the illustrative embodiment, the counter 114 is an eight bit counter which is enabled when the HOLD input is low. The counter 114 counts down when the n_updn signal is at a logic high level. The counter 114 is reset by the DAC_RESET_N signal whenever the AGC counter 70 (FIG. 1) makes a step and whenever the AOA counter 20 (FIG. 1) makes a step. The outputs of the PDAC counter 106 are coupled to inputs of the PDAC 110 and the outputs of the NDAC counter 114 are coupled to the NDAC 118, as shown.

With reference to the various clocking signals and functions described herein, it will be appreciated by those of ordinary skill in the art that such signals may, in some cases, be provided by the same or a related clock signal. In one particular embodiment, three DAC-related clock phases are derived from the same master clock having a frequency of approximately 2 MHz. The 3 phases define 3 serial operations in order to make each DAC movement. The phases are: synchronize inputs, clock state machine, and clock DAC counter. The synchronize inputs stage latches in the logic inputs to the DAC state machine (latches not shown) to guarantee setup/hold time requirements for the UPDN and HOLD latches. The clock state machine phase (i.e., CLK_UPDATE_SM) latches the UPDN and HOLD signals for PDAC and NDAC for either the conservative update controller 208 or the aggressive update controller 210. The clock DAC counter phase (i.e., CLK_UPDATE_COUNTER) clocks the 8 bit PDAC/NDAC counters 106, 114 which will move up, move down, or hold depending on the UPDN and HOLD inputs. It will be appreciated by those of ordinary skill in the art that various schemes are possible for providing the various clock signals and functions for the detector 10.

As noted above, the AOA_TO_DAC signal 36 is set (i.e., an AOA_TO_DAC event occurs) at the occurrence of a predetermined increase of the PDAC signal or a predetermined decrease of the NDAC signal or, stated differently, once the DIFF signal has passed through the PDAC signal level or the NDAC signal level by a predetermined voltage threshold amount. In practice, the voltage threshold is determined by a fixed number of DAC steps. The voltage threshold is established by two counters 216, 218 within the DAC control circuit 104 reaching a predetermined count value. Counter 216 is responsive to the PDAC control signals and counter 218 is responsive to the NDAC control signals. Here, counters 216 and 218 are six bit counters.

The reset input to the counter 216 is coupled to an inverter 220 so that the counter 216 is reset when the POSCOMP signal 30 goes low. The counter 216 is enabled when the PDAC signal 130 is increased to track a rising DIFF signal 18 that exceeds the PDAC signal. To this end, an AND gate 224 has a first input coupled to a CLK_UPDATE_COUNTER signal, a second input responsive to an inverted version of the p_hold signal via an inverter 222, and a third input coupled to the p_updn signal, as shown. Thus, the counter 216 is clocked only when the PDAC counter 106 is counting up.

The reset input to the counter 218 is coupled to the POSCOMP signal 30. The counter 218 is enabled when the NDAC signal 134 is decreased to track a falling DIFF signal 18 that has fallen below the NDAC signal. To this end, an AND gate 230 has a first input coupled to the CLK_UPDATE_COUNTER signal, a second input responsive to an inverted version of the n_hold signal via an inverter 226, and a third input coupled to an inverted version of the n_updn signal via an inverter 228, as shown. Thus, the counter 218 is clocked only when the NDAC counter 114 is counting down.

A predetermined output of the counter 216 and of the counter 218 are coupled to inputs of an OR gate 234 that provides the set input to a latch 236. In particular, here, the count 32 outputs of the counters 216 and 218 are coupled to the OR gate 234 so that, when either counter 216 or counter 218 reaches a count value of 32, the output of OR gate 234 goes high to set the latch 236 and thus, to set the AOA_TO_DAC flag signal 36 provided at the output of the latch 236. Thus, the AOA_TO_DAC signal 36 goes high only when the PDAC counter 106 has incremented 32 times (without being reset) or when the NDAC counter 114 has decremented 32 times (without being reset). It will be appreciated that various count values can be used to trigger and AOA_TO_DAC event. In the illustrative embodiment, count 32 is used based on the DAC resolution and the minimum DIFF peak-to-peak signal size in order to eliminate the above-described error condition of the detector output signal failing to switch due to an offset shift. In this way, the AOA_TO_DAC signal 36 goes high to indicate an AOA_TO_DAC event after the PDAC signal or NDAC signal has taken a predetermined number of steps.

The latch 236 is reset in response to the output of an OR gate 240 having a first input signal, DELTA_POSCOMP that is an edge-stripped version of the POSCOMP signal 30 (i.e., meaning that the DELTA_POSCOMP signal is active for a predetermined interval upon each transition, both high and low, of the POSCOMP signal) and a second input responsive to an inverted version of a CNTX_LAT signal via an inverter 238. In the illustrative embodiment, a signal CNTX_LAT (FIG. 10) transitions after a predetermined number of transitions of the POSCOMP signal, thereby indicating the end of the calibration mode of operation and the beginning of the running mode of operation. The CNTX_LAT signal may be provided at the output of a latch that is set in response to the predetermined number of POSCOMP signal transitions and is reset at startup, for example. Thus, the latch 236 is reset upon either of the following conditions occurring: a POSCOMP signal transition or if the detector is not in the running mode of operation.

The AGGR_UPDATE signal is generated by latches 244 and 248 and gates 242 and 246 as follows. The latch 244 is set in response to the AOA_TO_DAC signal 36 going high and this condition causes the AGGR_UPDATE signal to go high upon the next POSCOMP signal transition, by operation of the AND gate 246 that is responsive to the output of latch 244 and the DELTA_POSCOMP signal. As will become apparent in conjunction with FIG. 11, when the AGGR_UPDATE signal is high, the aggressive update controller 210 provides the PDAC and NDAC control signals. The AGGR_UPDATE signal goes low upon either of the following conditions occurring: a counter 196 reaching a predetermined count (from the initiation of an AOA_TO_DAC event), such as three, (i.e., a PC_CNT3 signal transition) or the detector not being in the running mode of operation.

More particularly, the PC_CNT3 signal is generated by a counter 196 and determines the interval during which the aggressive update controller 210 controls the PDAC 110 and the NDAC 118 after an AOA_TO_DAC event occurs. In particular, the counter 196 is reset in response to a PC_CNT_RST signal that goes high when either the detector enters the running mode of operation (i.e., when the CNTX_LAT signal goes high) or when the AGGR_UPDATE signal is low. The counter 196 is clocked upon a POSCOMP signal transition when the PC_CNT_RST signal is low. In other words, the counter 196 is enabled as long as the detector is in the running mode when the AGGR_UPDATE signal is high. Thus, the counter 196 establishes some number of gear teeth that must pass before control by the aggressive update controller 210 is terminated and control by the conservative update controller 208 resumes.

Figure 3A:
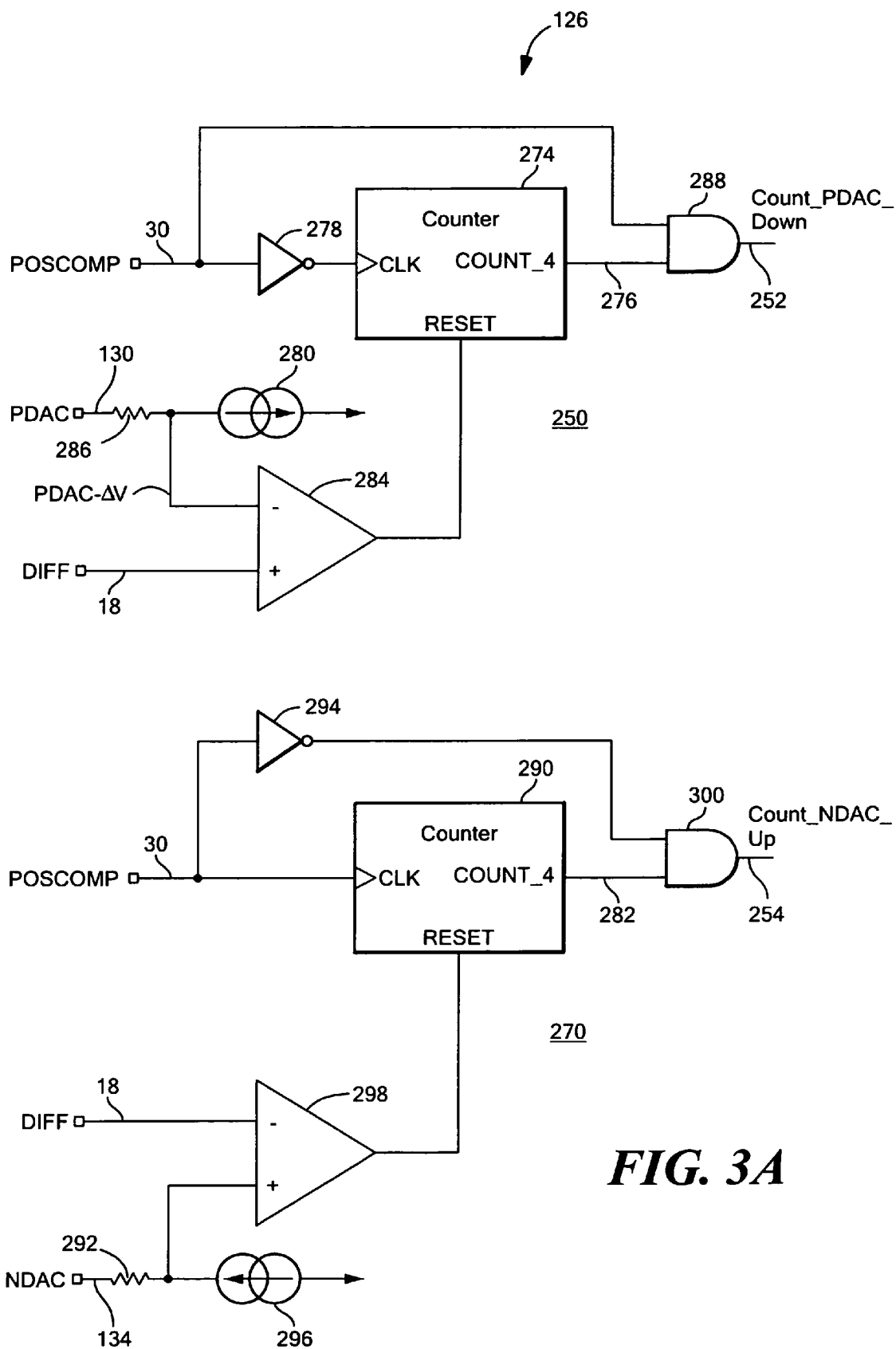
FIGS. 3A and 3B are a block diagram of the conservative update controller of the DAC control circuit of FIGS. 2A and 2B.
Figure 3B:
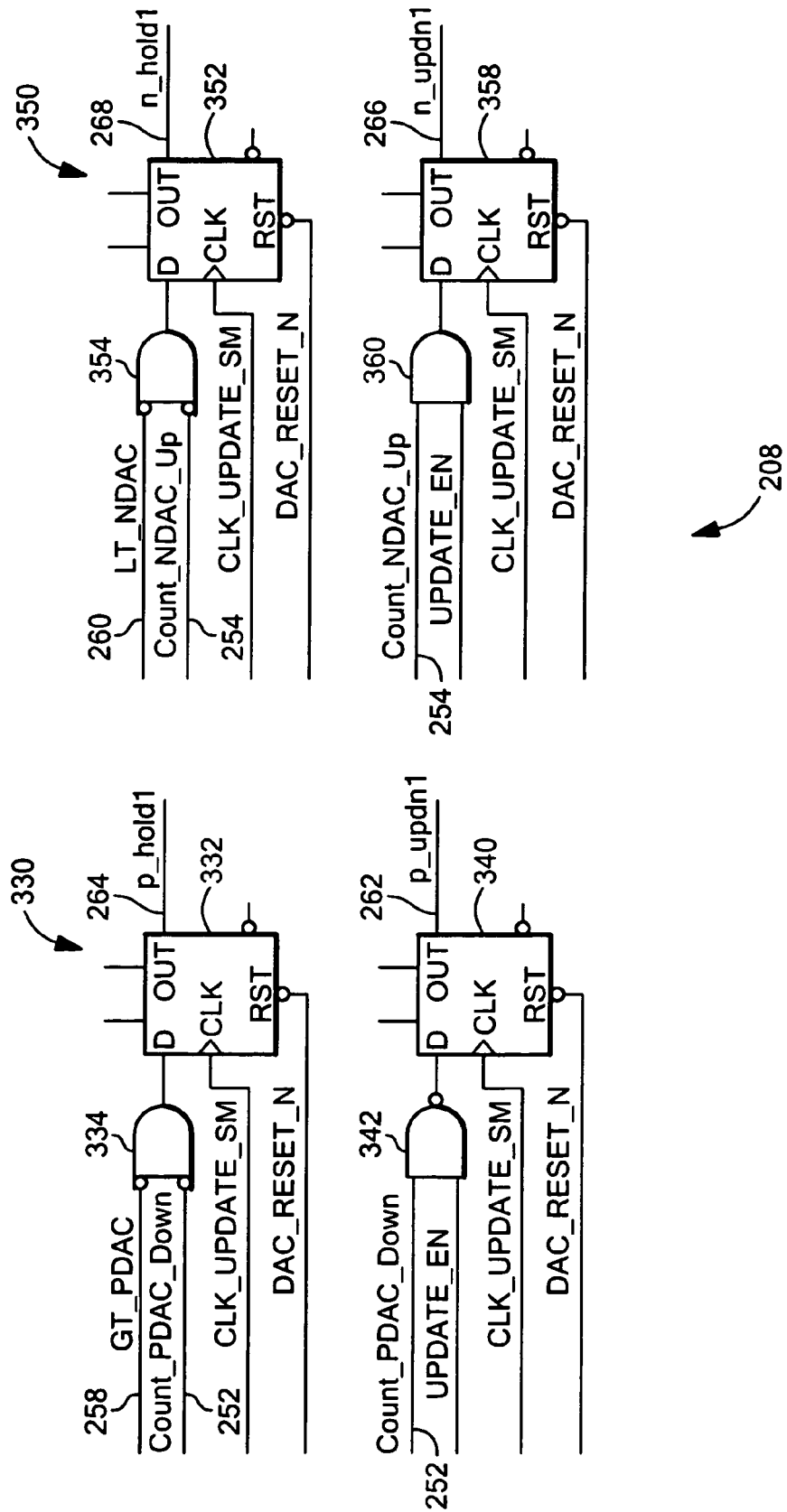

Referring also to FIGS. 3A and 3B, an illustrative embodiment for the conservative update controller 208 is shown to include a positive portion 250 responsive to the POSCOMP signal 30, the PDAC signal 130 and the DIFF signal 18 for generating a Count_PDAC_Down signal 252. A negative circuit portion 270 is responsive to the POSCOMP signal 30, the NDAC signal 134 and the DIFF signal 18 for generating a Count_NDAC_Up signal 254, as shown.

Circuit portion 250 includes a counter 274 that is clocked by an inverted version of the POSCOMP signal 30 and that is reset by the output signal of a comparator 284. Counter 274 provides a Count_4 output signal 276 that goes high when a predetermined number of positive clock signal edges (i.e., negative edges of the POSCOMP signal 30) have occurred. The Count_4 signal may be the same as, or substantially similar to the CNTX_LAT signal. In the illustrative embodiment, the predetermined number of positive clock signal edges is four. However, it will be appreciated that this number can be readily varied. Comparator 284 provides an output signal that goes high when the DIFF signal 18 exceeds a positive update threshold signal, PDAC-$\Delta$v, that is at a predetermined offset voltage below the PDAC signal 130, as established by resistor 286 and current source 280. The output signal 276 of counter 274 is coupled to an input of an AND gate 288, a second input to which is provided by the POSCOMP signal 30, as shown.

Figure 4:
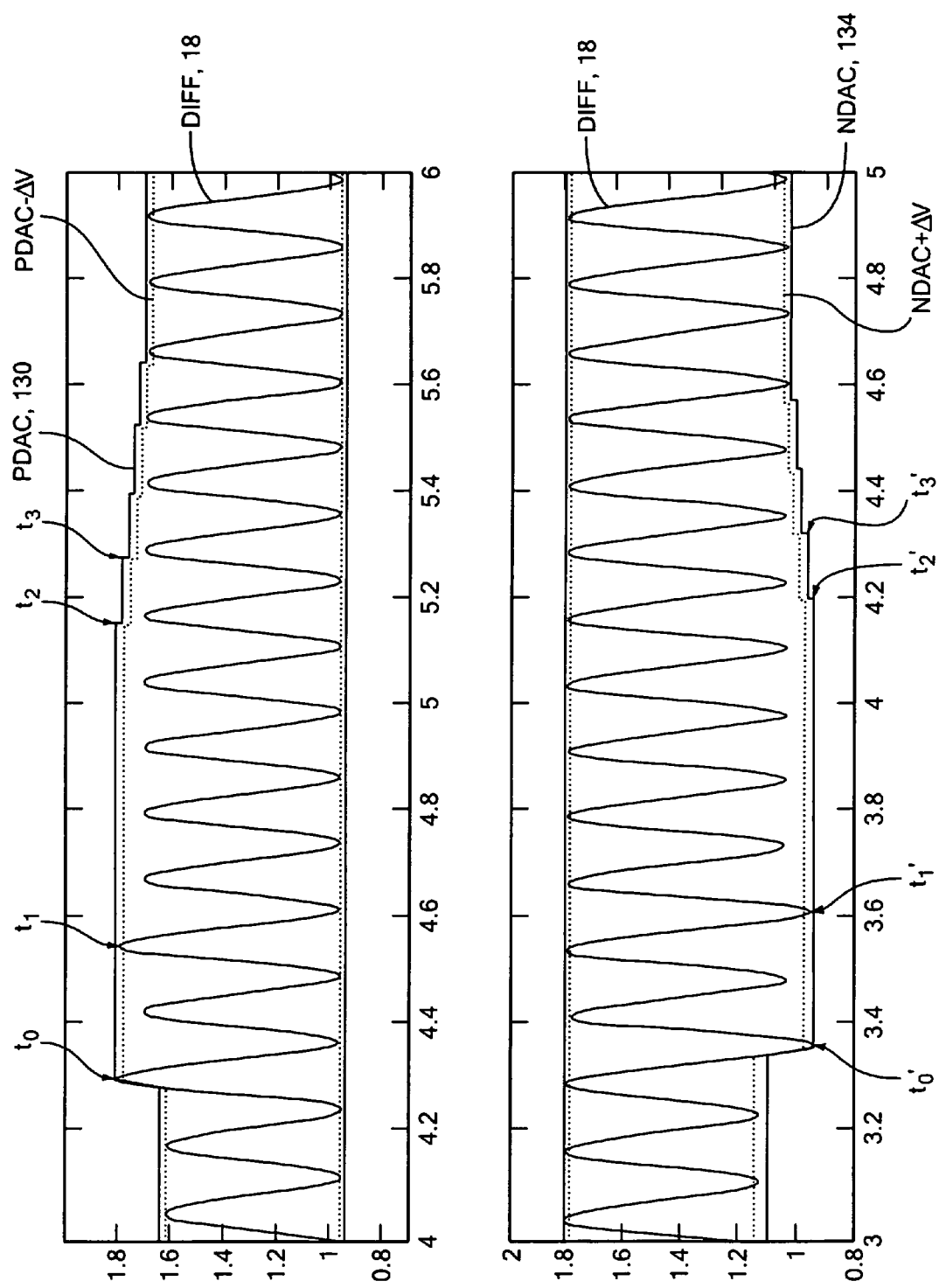
FIG. 4 shows an illustrative DIFF signal and associated PDAC signal being updated by the conservative update controller of FIGS. 3A and 3B and an illustrative DIFF signal and associated NDAC signal being updated by the conservative update controller of FIGS. 3A and 3B.

Referring also to the illustrative DIFF signal 18, PDAC signal 130, and PDAC-$\Delta$v signal of FIG. 4, the PDAC signal 130 is lowered by one PDAC increment (i.e., the Count_PDAC_Down signal 252 goes high) once four positive peaks of the DIFF signal occur that are lower than the PDAC-$\Delta$V signal level (i.e., once four negative transitions of the POSCOMP signal occur, causing the Count_4 signal 276 to go high). For example, at times t2 and t3, the PDAC signal 130 is lowered by one DAC increment since the Count_4 signal 276 goes high on positive edges of the POSCOMP signal. However, once the DIFF signal exceeds the PDAC-$\Delta$v level, as occurs at time t1 for example, the counter 274 is reset and another four positive peaks of the DIFF signal must exceed the PDAC-$\Delta$v signal before the PDAC signal is lowered again. In this way, limited "inward" updating of the PDAC signal is achieved since the PDAC signal is decreased only when a predetermined number of consecutive DIFF signal positive peaks are below the PDAC-$\Delta$V signal level.

"Outward" updating of the PDAC signal 130 occurs freely. In other words, any time the DIFF signal 18 exceeds the PDAC signal 130, the PDAC signal is increased, for example as shown at time t0.

Similar to PDAC circuit portion 250, NDAC circuit portion 270 includes a counter 290 that is clocked by the POSCOMP signal 30 and that is reset by the output signal of a comparator 298. Counter 290 provides a Count_4 output signal 282 that goes high when a predetermined number of positive edges of the POSCOMP signal 30 occur, such as four in the illustrated embodiment. Comparator 298 provides an output signal that goes high when the DIFF signal 18 falls to below a negative update threshold signal, NDAC+$\Delta$v, that is at a predetermined offset voltage above the NDAC signal 134, as established by a resistor 292 and current source 296. The output of counter 290 is coupled to an input of an AND gate 300, a second input to which is provided by an inverted version of the POSCOMP signal 30 at the output of an inverter 294, as shown.

Referring also to the illustrative DIFF signal 18, NDAC signal 134, and NDAC+$\Delta$v signal of FIG. 4, the NDAC signal 134 is increased by one NDAC increment (i.e., the Count_NDAC_Up signal 254 goes high) once four negative peaks of the DIFF signal occur that are greater than the NDAC+$\Delta$V signal level (i.e., once four positive transitions of the POSCOMP signal occur, causing the Count_4 signal 282 to go high). For example, at times t2 and t3, the NDAC signal 134 is raised by one DAC increment since the Count_4 signal 282 goes high on positive edges of the POSCOMP signal. However, once the DIFF signal falls to below the NDAC+$\Delta$v level, as occurs at time t1' in FIG. 4 for example, the counter 290 is reset and another four consecutive negative peaks of the DIFF signal must be above the NDAC+$\Delta$v signal before the NDAC signal is increased again. In this way, limited "inward" updating of the NDAC signal is achieved since the NDAC signal is increased only when a predetermined number of consecutive DIFF signal negative peaks exceed the NDAC+$\Delta$v signal level.

"Outward" updating of the NDAC signal 134 occurs freely. In other words, any time the DIFF signal 18 falls to below the NDAC signal 134, the NDAC signal is decreased, for example as shown at time t0.

Additional circuit portions 330, 350 of FIG. 3B synchronize operation of the counters 106, 114 to the clock signal. To this end, the PDAC portion 330 generates the p_hold1 signal 264 and the p_updn1 signal 262 and the NDAC portion 350 generates the n_hold1 signal 268 and the n_updn1 signal 266.

The PDAC portion 330 includes a latch 332 having an input provided by an AND gate 334, a clock input responsive to the CLK_UPDATE_SM signal, a reset input provided by the DAC_RESET_N signal, and provides the p_hold1 signal 264 at an output. The AND gate 334 is responsive to the GT_PDAC signal 258 and to the Count_PDAC_Down signal 252, as shown.

In operation, when Count_PDAC_Down 252 is low (indicating that four positive peaks of the DIFF signal less than the PDAC-$\Delta$v signal level have not occurred) and PDAC is greater than DIFF (GT_PDAC is high), the input to the latch 332 is high, thereby causing the p_hold1 signal 264 to go high on the next rising edge of the CLK_UPDATE_SM signal, to hold the value of counter 106, thereby preventing updating of the PDAC signal 130. Whereas, when the Count_PDAC_Down signal 252 is high (indicating that four positive peaks of the DIFF signal less than the PDAC-$\Delta$v signal level have occurred) and the PDAC signal is less than the DIFF signal (GT_PDAC is low), the p_hold1 signal 264 goes low on the next rising edge of the CLK_UPDATE_SM signal to cause the counter 106 to be released and thus, to count.

A second latch 340 of the PDAC portion 330 has an input provided by a NAND gate 342, a clock input responsive to the CLK_UPDATE_SM signal, a reset input provided by the DAC_RESET_N signal, and provides the p_updn1 signal 262 at an output. The NAND gate 342 is responsive to the UPDATE_EN signal and to the Count_PDAC_Down signal 252, as shown.

In operation, when the Count_PDAC_Down signal 252 is high (indicating that four positive peaks of the DIFF signal less than the PDAC-$\Delta$v signal level have occurred) and the UPDATE_EN signal is high (indicating that the DACs are free to update since the AGC operation has ended), the input to latch 340 is low, thereby causing the p_updn1 signal 262 to go low on the next rising edge of the CLK_UPDATE_SM signal. A low p_updn1 signal 262 causes the counter 106 to count down, as occurs, for example at times t2 and t3 in FIG. 4. Under all other conditions, the latch input and the p_updn1 signal 262 remain high, thereby causing the direction of counter 106 to be up so as to allow the PDAC 110 to freely track the DIFF signal in the outward, increasing direction as shown at time t0 in FIG. 4.

The NDAC portion 350 operates in a similar manner to the PDAC portion as follows. A latch 352 is provided with an input coupled to the output of an AND gate 354, a clock input responsive to the CLK_UPDATE_SM signal, a reset input provided by the DAC_RESET_N signal, and provides the n_hold1 signal 268 at an output. The AND gate 354 is responsive to the LT_NDAC signal 260 and to the Count_NDAC_Up signal 254, as shown.

In operation, when the Count_NDAC_Up signal 254 is low (indicating that four negative peaks of the DIFF signal greater than the NDAC+$\Delta$V signal level have not occurred)

and the NDAC signal 134 is less than the DIFF signal (LT_NDAC is high), the input to the latch 352 is high, thereby causing the n_hold1 signal 268 to go high on the next rising edge of the CLK_UPDATE_SM signal, to hold the value of counter 114, thereby preventing updating of the NDAC signal 134. Whereas, when the Count_NDAC_Up signal 254 is high (indicating that four negative peaks of the DIFF signal greater than the NDAC+ΔV signal level have occurred) and the NDAC signal is greater than the DIFF signal (LT_NDAC is low), the n_hold1 signal 268 goes low on the next rising edge of the CLK_UPDATE_SM signal to cause the counter 114 to be released and thus, to count.

A second latch 358 of the NDAC portion 350 has an input provided by a NAND gate 360, a clock input responsive to the CLK_UPDATE_SM signal, a reset input provided by the DAC_RESET_N signal, and provides the n_updn1 signal 266 at an output. The NAND gate 360 is responsive to the UPDATE_EN signal and to the Count_NDAC_Up signal 254, as shown.

In operation, when the Count_NDAC_Up signal 254 is high (indicating that four negative peaks of the DIFF signal greater than the NDAC+ΔV signal level have occurred) and the UPDATE_EN signal is high (indicating that the DACs are free to update since the AGC operation has ended), the input to latch 358 is low, thereby causing the n_updn1 signal 266 to go low on the next rising edge of the CLK_UP-DATE_SM signal. A low n_updn1 signal 266 causes the counter 114 to count up, as occurs, for example, at times t2' and t3' in FIG. 4. Under all other conditions, the latch input and the n_updn1 signal 266 remain high, thereby causing the direction of counter 114 to be down so as to allow the NDAC 118 to freely track the DIFF signal in the outward, decreasing direction, as shown at time t0' in FIG. 4.

Figure 5:
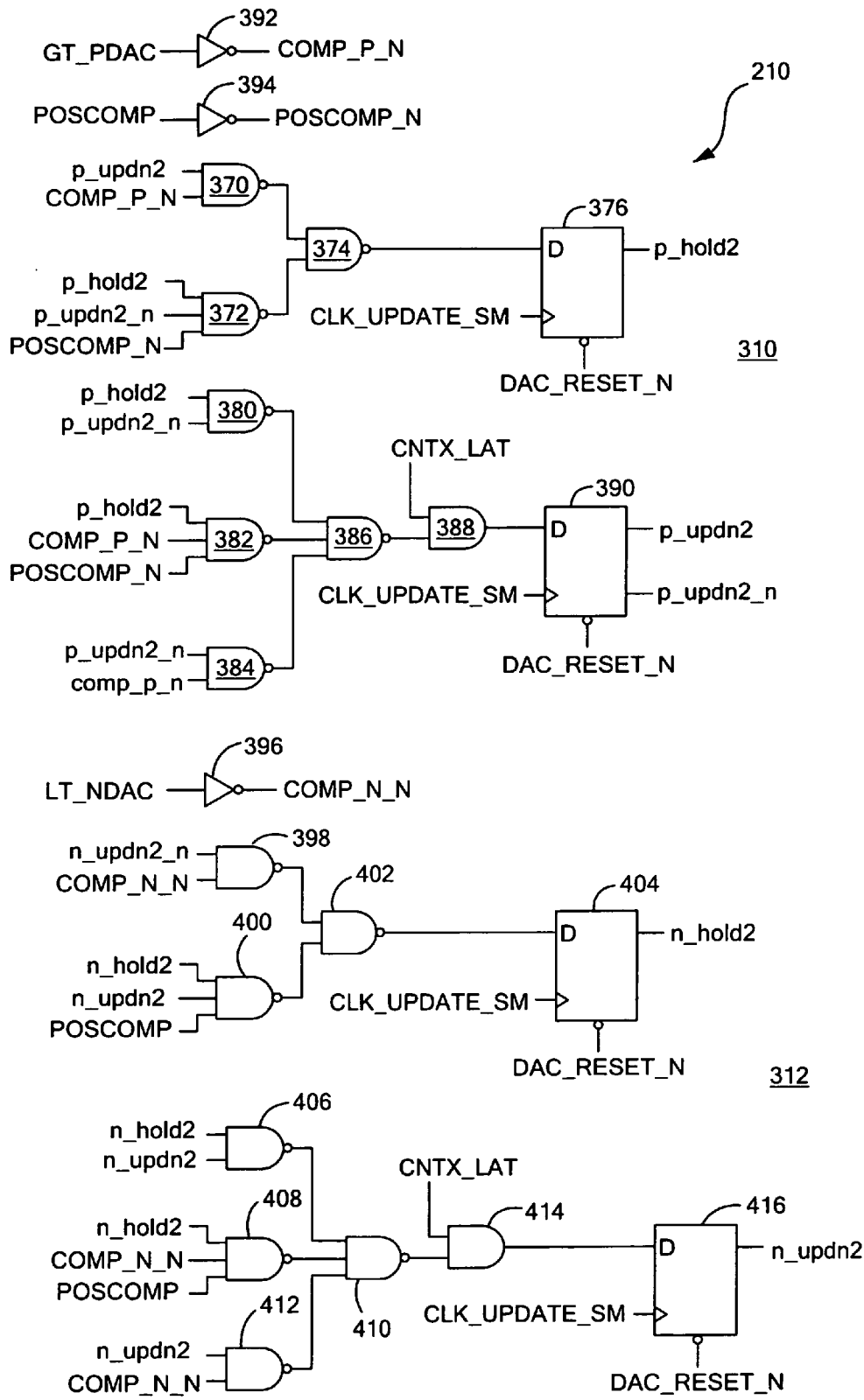
FIG. 5 is a block diagram of an optional aggressive update controller of the DAC control circuit of FIGS. 2A and 2B.

Referring to FIG. 5, an illustrative embodiment of the aggressive update controller 210 includes a positive circuit portion 310 providing the p_hold2 signal and the p_updn2 signal for controlling the PDAC counter 106 when the multiplexer 214 selects control by the controller 210. A negative circuit portion 312 of the controller 210 provides the n_hold2 signal and the n_updn2 signal for controlling the NDAC counter 114 when the multiplexer 214 selects control by the controller 210.

In general, upon each transition of the POSCOMP signal 30, one of the PDAC and NDAC signals is updated, or reset to the level of the DIFF signal 18, following which the one of the PDAC and NDAC signals is allowed to follow DIFF up to the next positive peak or down to the next negative peak, respectively. More particularly, the POSCOMP signal becomes a first binary level when the DIFF signal rises to exceed the switching threshold signal and a second binary level when the DIFF signal falls to below the switching threshold signal. Upon each transition of the POSCOMP signal from the second binary level to the first binary level, the PDAC signal 130 is updated to the level of the DIFF signal and is thereafter allowed to follow the DIFF signal up to its next positive peak value. Likewise, upon each transition of the POSCOMP signal from the first binary level to the second binary level, the NDAC signal is updated to the level of the DIFF signal and is thereafter allowed to follow the DIFF signal down to its next negative peak.

The update controller 210 is responsive to the DIFF signal and a CLK_UPDATE_SM signal. The update controller 210 is further responsive to the POSCOMP signal 30, the POSCOMP_N signal from inverter 394, the COMP_P_N signal from inverter 392, and the COMP_N_N signal from inverter 396, as shown.

Figure 6:
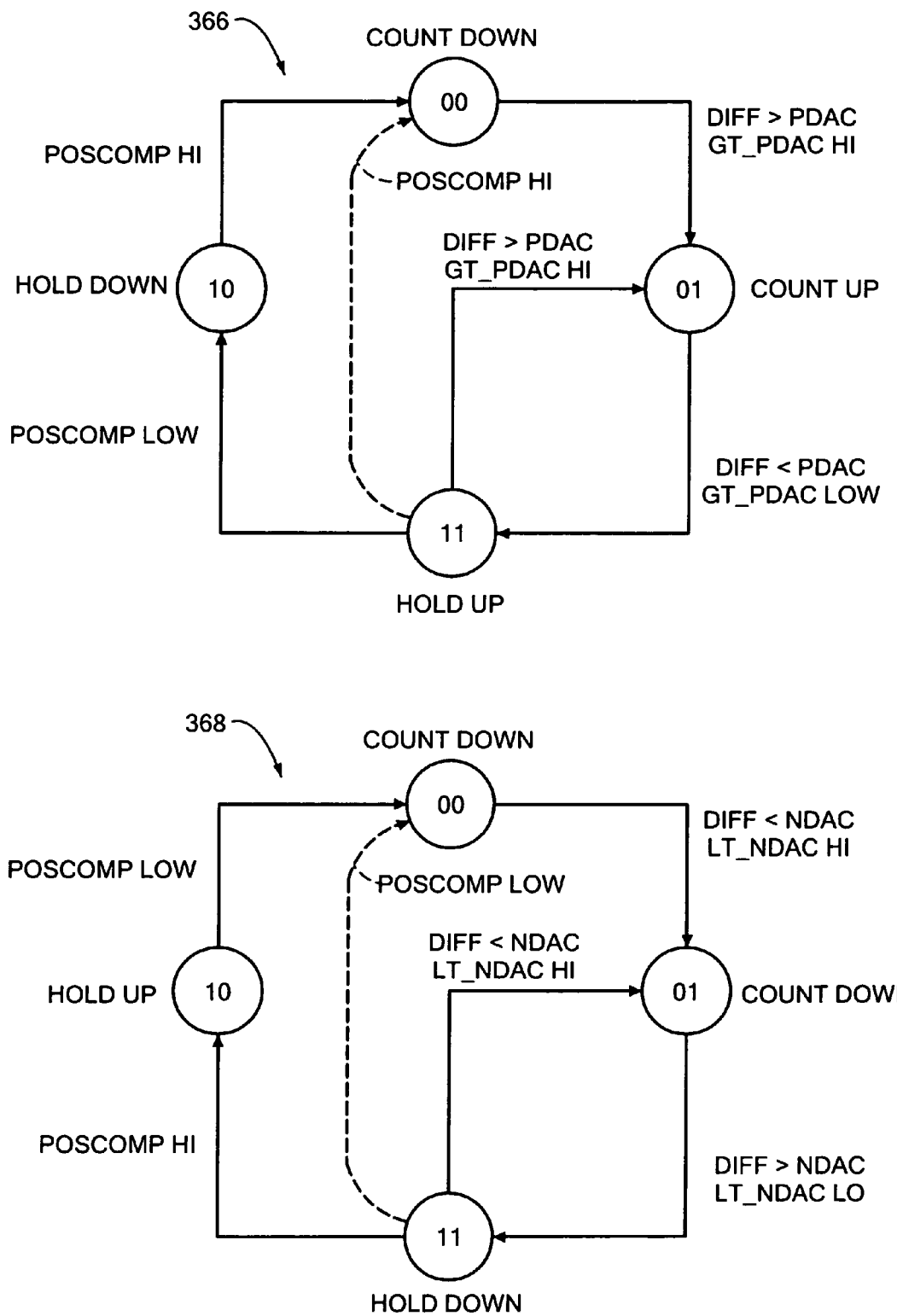
FIG. 6 is an illustrative state diagram associated with the aggressive update controller of FIG. 6.

In one embodiment, the update controller 210 is implemented with a state machine as illustrated in FIG. 6. Before considering the implementation of the update controller 210 illustrated in FIG. 6, the manner in which the PDAC and NDAC voltages are updated will be described with reference to FIG. 7 that shows an illustrative DIFF signal 18 along with the PDAC signal 130, NDAC signal 134, a switching threshold signal $V_{TH}$, and the resulting POSCOMP signal 30.

Figure 7:
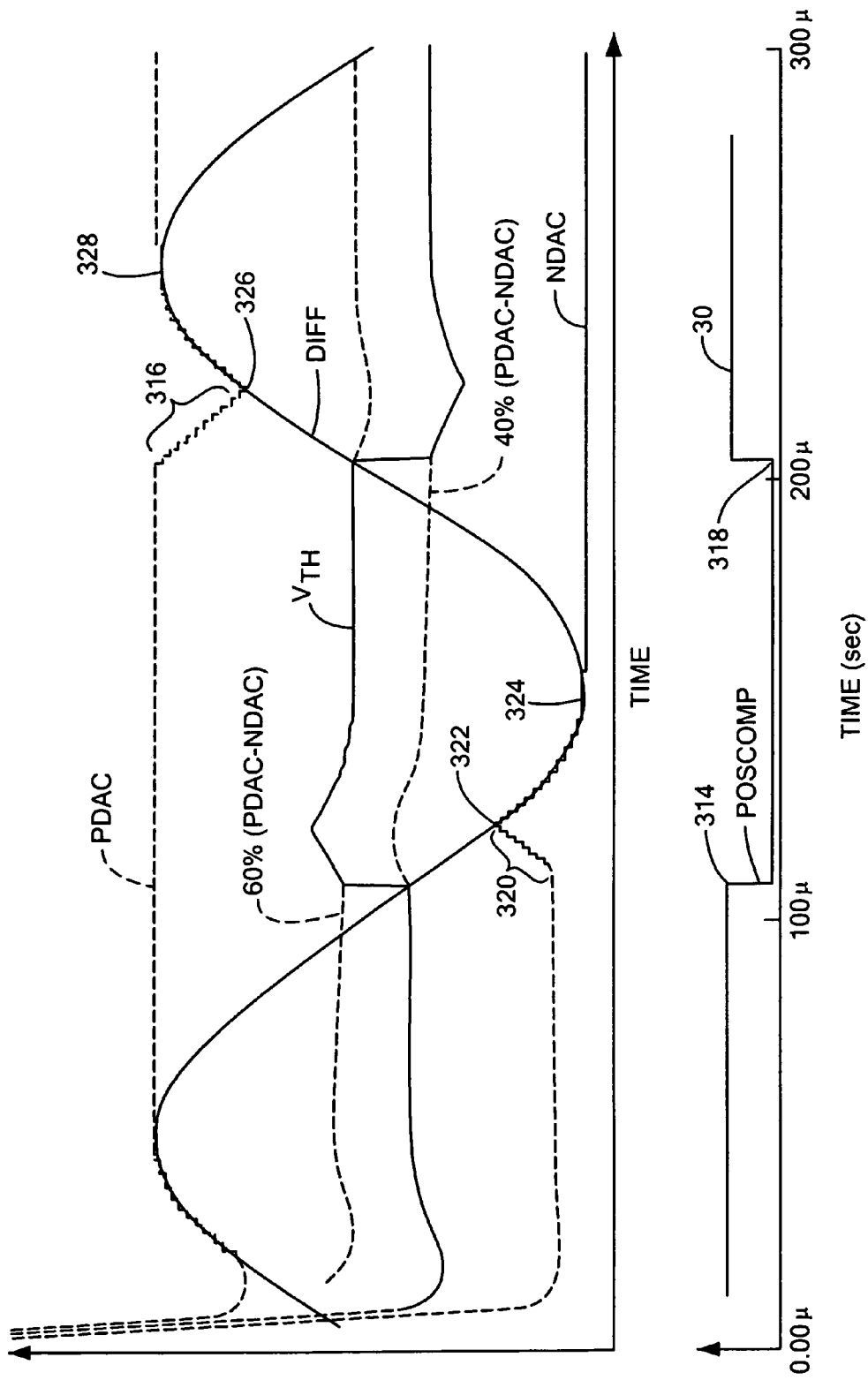
FIG. 7 shows an illustrative DIFF signal and the associated PDAC and NDAC signals being updated by the aggressive update controller of FIG. 5 along with the resulting POSCOMP signal.

As will be described furthering connection with FIGS. 8 and 9, in the detector 10, there are two switching threshold signals, THRESHHI and THRESHLO, each of which is at one of two threshold signal levels at any given time. In other embodiments, there may be a single switching threshold signal $V_{TH}$ that provides hysteresis by assuming different signal levels. For simplicity of illustration, a single switching threshold signal $V_{TH}$ is shown in FIG. 7. As shown, the switching threshold signal $V_{TH}$ is at a first signal level corresponding to a first percentage of the peak-to-peak DIFF signal, such as 60% (PDAC-NDAC), when the DIFF signal exceeds the threshold signal or is at a second signal level corresponding to a second percentage of the peak-to-peak DIFF signal, such as 40% (PDAC-NDAC), when the DIFF signal is less than the threshold signal.

Upon each transition of the POSCOMP signal 30, the PDAC and NDAC signals are decreased or increased, respectively, to the level of the DIFF signal. In particular, the PDAC signal is decreased to the value of the DIFF signal upon each transition of the POSCOMP signal of a first polarity and the NDAC signal is increased to the level of the DIFF signal upon each transition of the POSCOMP signal of the second, opposite polarity. In the illustrative embodiment, the PDAC signal is decreased to the value of the DIFF signal as labeled 316 upon each positive-going transition of the POSCOMP signal as labeled 318 and the NDAC signal is increased to the value of the DIFF signal as labeled 320 upon each negative-going transition of the POSCOMP signal as labeled 314. Thereafter, the PDAC and NDAC signals are allowed to track the next positive and negative peak, respectively, of the DIFF signal. That is, beginning at a time labeled 326, the PDAC signal tracks the DIFF signal up to the next positive peak which occurs at a time labeled 328 and, beginning at a time labeled 322, the NDAC signal tracks the DIFF signal down to the next negative peak which occurs at a time labeled 324.

In the illustrative detector 10, the aggressive update controller 210 is normally disabled, other than for an interval corresponding to a predetermined number of gear teeth passing after an AOA_TO_DAC event. Also, the conservative update controller 208 is disabled for a predetermined number of transitions of the POSCOMP signal following start up of the detector 10 in order avoid conflicts between AGC and the threshold update schemes. In the illustrative embodiment, the conservative update controller 208 is disabled for a number of transitions of the POSCOMP signal following start up, as established by the CNTX_LAT signal.

Figure 2B:
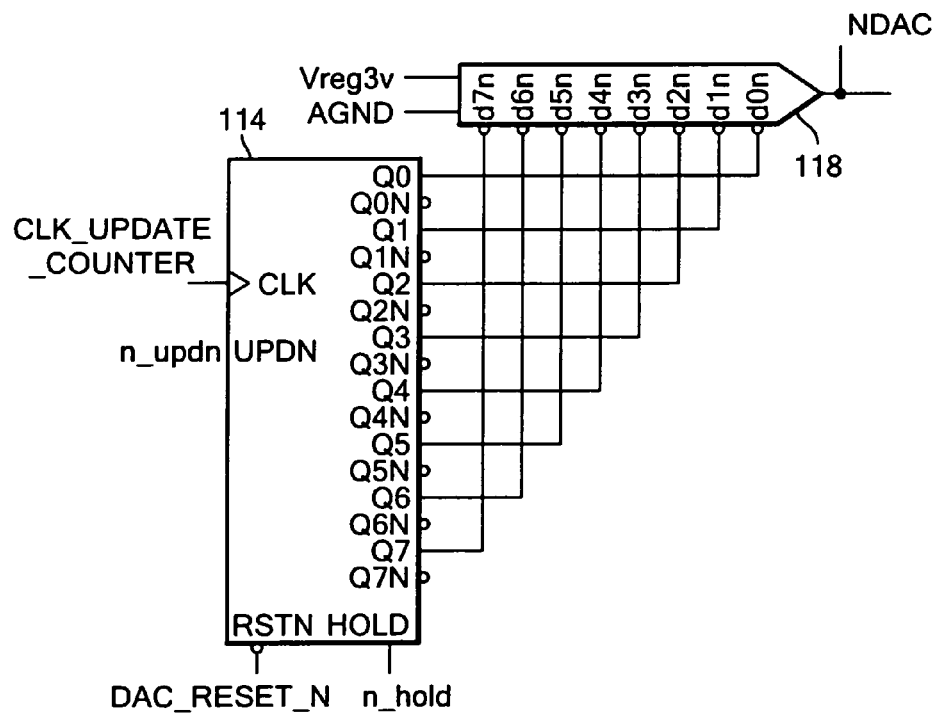

Referring to FIG. 6, a first state diagram 366 illustrates operation of the positive portion 310 of the update controller 210 and a second state diagram 368 illustrates operation of the negative portion 312 of the update controller 210. The first digit of a particular state (e.g., 0 for state 00, 0 for state 01, 1 for state 10, and 1 for state 11) indicates whether or not the HOLD input to the respective counter 106, 114 (FIGS. 1 and 2) is asserted and the second digit indicates whether or not the UPDN input to the respective counter is asserted when counters 106, 114 are controlled by the update controller 210.

Considering the state diagram 366 for the positive portion 310 of the update controller 210, in state 00, the counter 106 is enabled and counts down (i.e., the p_updn2 signal is low and the p_hold2 signal is low). The update controller 210 is in this state during time interval 316 in FIG. 7. Once the DIFF signal exceeds the PDAC voltage 130, as occurs at time 326 in FIG. 7, the state machine transitions to a state 01 in which the counter 106 is enabled and counts up (i.e., the p_updn2 signal is high and the p_hold2 signal remains low). Once the PDAC voltage exceeds the DIFF signal, the state machine transitions to state 11 in which the p_hold2 signal is high, disabling the counter 106 and the p_updn2 signal is high.

The state machine remains in state 11 and the NDAC voltage is held constant until either the DIFF voltage exceeds the PDAC voltage again or the POSCOMP signal transitions low. If the DIFF voltage exceeds the PDAC voltage, the state machine returns to state 01 and the counter 106 continues to count up. The state machine remains in this loop, transitioning between states 01 and 11, as the PDAC voltage climbs from the level of the DIFF signal to the next positive peak (i.e., between times 326 and 328 in FIG. 7).

When the POSCOMP signal transitions to a low level, a state 10 is entered in which the p_hold2 signal remains high, disabling the counter 106 and the p_updn2 signal is low. Once the POSCOMP signal transitions to a high level, state 00 is again entered and the counter 106 counts down, thereby resetting the PDAC voltage to the DIFF signal level. It will be appreciated by those of ordinary skill in the art that state 10 could be omitted (as indicated by the dotted line). In this case, the state machine transitions from state 11 directly to state 00 upon positive-going transitions of the POSCOMP signal.

The state diagram 368 for the negative portion 312 of the update controller 210 is symmetrical, but opposite in polarity with respect to the state diagram 366. In particular, in state 00, the counter 114 is enabled and counts up (i.e., the n_updn2 signal is low and the n_hold2 signal is low). The update controller 210 is in this state 00 during time interval 320 in FIG. 7.

Once the DIFF signal is less than the NDAC signal, as occurs at time 322 in FIG. 7, the state machine transitions to a state 01 in which the counter 114 is enabled and counts down (i.e., the n_updn2 signal is high and the n_hold2 signal remains low). Once the DIFF signal exceeds the NDAC voltage, as occurs at time 324 in FIG. 7, the state machine transitions to a state 11 in which the counter 114 is disabled and the n_updn2 signal is high.

The state machine remains in state 11 and the NDAC voltage is held constant until either the DIFF voltage again becomes less than the NDAC voltage or the POSCOMP signal transitions high. When the DIFF voltage falls to below the NDAC voltage, the state machine returns to state 01 and the counter 114 continues to count down. The state machine remains in this loop, transitioning between states 01 and 11, as the NDAC voltage falls from the level of the DIFF signal to the next negative peak (i.e., between times 322 and 324 in FIG. 7).

When the POSCOMP signal transitions to a high level, a state 10 is entered in which the n_hold2 signal remains low, disabling the counter 114 and the n_updn2 signal is high. Once the POSCOMP signal transitions to a low level, then state 00 is again entered and the counter 114 counts up, thereby resetting the NDAC voltage to the DIFF voltage level. Here again, it will be appreciated by those of ordinary skill in the art that state 10 could be omitted (as indicated by the dotted line). In this case, the state machine transitions from state 11 directly to state 00 upon negative-going transitions of the POSCOMP signal.

It will be appreciated by those of ordinary skill in the art that the state diagrams 366, 368 (or as modified by the dotted lines in state diagrams 366, 368) could be implemented with various circuitry. One suitable implementation is shown in FIG. 5. In particular, the p_hold2 signal is generated with NAND gates 370, 372, 374, and flip-flop 376. The gate 370 is responsive to the p_updn2 signal and the COMP_P_N signal provided at the output of inverter 392. Gate 372 is responsive to the p_hold2, p_updn2_n, and POSCOMP_N signals. The outputs of gates 370 and 372 are coupled to inputs of gate 374 which provides, at its output, the D input to flip-flop 376. The flip-flop 376 is clocked by the CLK_UPDATE_SM signal and reset by a DAC_RESET_N signal upon start up of the detector 10.

The p_updn2 and p_updn2_n signals are generated by NAND gates 380, 382, 384, and 386, AND gate 388, and flip-flop 390, as shown. In particular, gate 380 is responsive to the p_hold2 and p_updn2_n signals, gate 382 is responsive to the p_hold2, COMP_P_N, and POSCOMP_N signals, and gate 384 is responsive to the p_updn2_n and COMP_P_N signals, as shown. The outputs of gates 380, 382, and 384 are coupled to inputs of gate 386, the output of which provides an input to AND gate 388. A further input to the gate 388 is provided by an CNTX_LAT signal which enables the positive portion of the update controller following a predetermined number of transitions of the POSCOMP signal following detector start up. The output of gate 388 provides the D input to flip-flop 390. Flip-flop 390 is clocked by the CLK_UPDATE_SM signal and is reset by a DAC_RESET_N signal upon start up of the detector.

The negative portion 312 of the update controller 210 is substantially similar to the positive portion 310. Accordingly, the n_hold2 signal is generated with NAND gates 398, 400, 402, and flip-flop 404. The gate 398 is responsive to the n_updn2_n signal and the COMP_N_N signal provided at the output of inverter 396. Gate 400 is responsive to the n_hold2, n_updn2, and POSCOMP signals. The outputs of gates 398 and 400 are coupled to inputs of gate 402 which provides, at its output, the D input to flip-flop 404. The flip-flop 404 is clocked by the CLK_UPDATE_SM signal and reset by a DAC_RESET_N signal upon start up of the detector 10.

The n_updn2 signal is generated by NAND gates 406, 408, 410, and 412, AND gate 414, and flip-flop 416, as shown. In particular, gate 406 is responsive to the n_hold2 and n_updn2 signals, gate 408 is responsive to the n_hold2, COMP_N_N, and POSCOMP signals, and gate 412 is responsive to the n_updn2 and COMP_N_N signals, as shown. The outputs of gates 406, 408, and 412 are coupled to inputs of gate 410, the output of which provides an input to AND gate 414. A further input to the gate 414 is provided by an CNTX_LAT signal which enables the negative portion of the update controller following a predetermined number of transitions of the POSCOMP signal following detector start up. The output of gate 414 provides the D input to flip-flop 416. Flip-flop 416 is clocked by the CLK_UPDATE_SM signal and is reset by a DAC_RESET_N signal upon start up of the detector.

As will be apparent from the above discussion of the aggressive update controller 210, updating the PDAC signal 130 and the NDAC signal 134 under the control of this controller provides relatively high accuracy in tracking the positive and negative peaks of the DIFF signal. This is because the PDAC and NDAC signals are "inwardly" updated to the present level of the DIFF signal on every cycle (i.e., upon every transition of the POSCOMP signal) and are allowed to freely track the PDAC and NDAC signals in an "outward" direction. However, sometimes the PDAC and NDAC signals can acquire on noise on the DIFF signal and if the noise has a greater magnitude than the DAC resolution, the switch point will be shifted slightly from one tooth to the next and one rotation to the next as the DAC settles to different codes based on the effect of noise, thereby resulting in jitter, or phase error.

As will be apparent from the above discussion of the conservative update controller 208, updating the PDAC signal 130 and the NDAC signal 134 under the control of this controller may provide slightly less accuracy than the aggressive update controller since "inward" updating of the PDAC and NDAC signals is limited, by updating only after a predetermined number of positive or negative peaks occur which are less than or greater than the PDAC-Δv signal and the NDAC+Δv signals, respectively. Like the aggressive update controller 210, the conservative update controller 208 also allows free tracking of the PDAC and NDAC signals in an "outward" direction. Thus, while the conservative update controller 208 may have somewhat better jitter performance than the aggressive update controller, it may provide slightly less accuracy since inward updating is limited.

Figure 11:
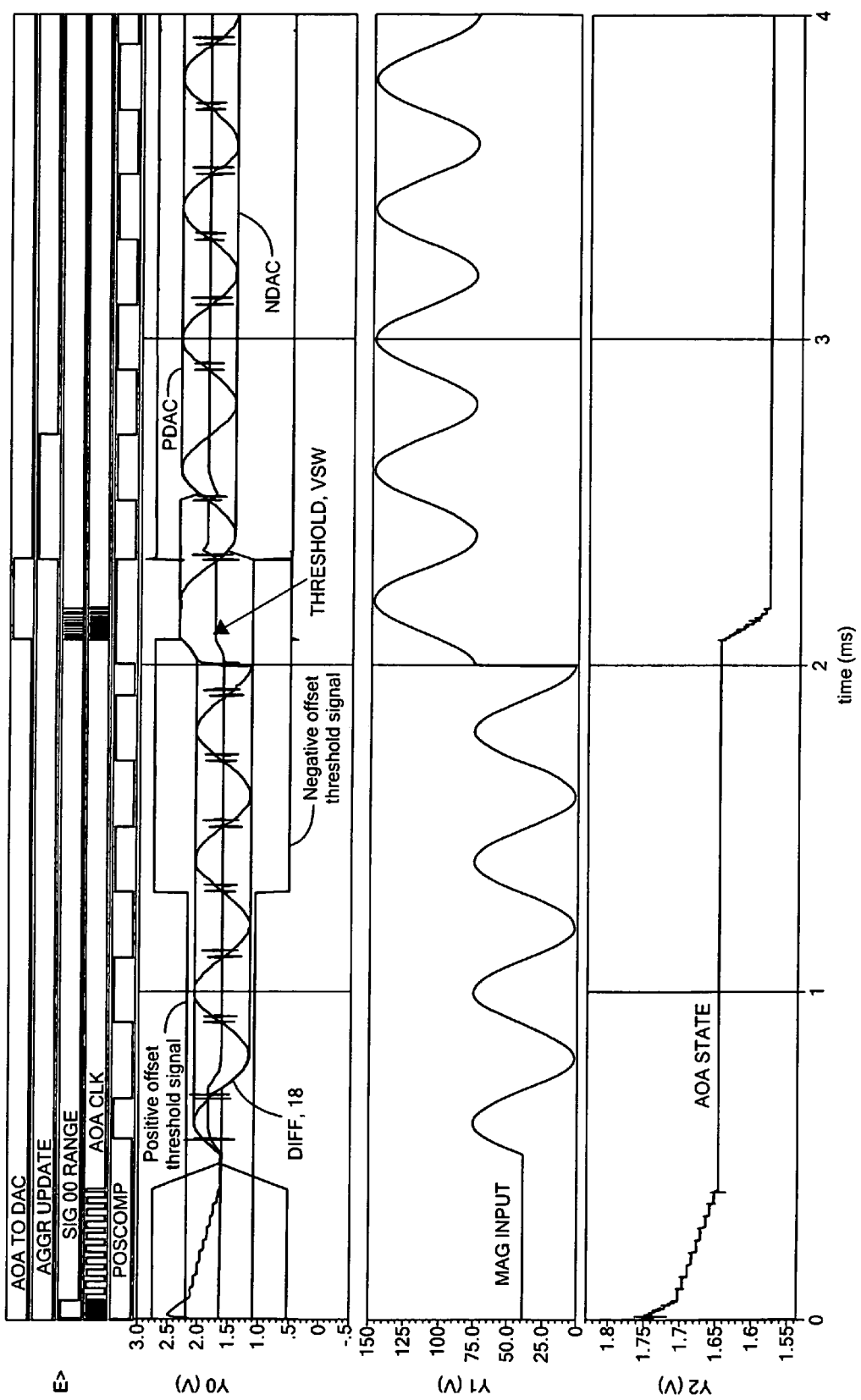
FIG. 11 shows several waveforms associated with operation of the AOA/AGC learn circuit of FIG. 10 and the AOA circuit of FIG. 1.

Since the aggressive update controller 210 causes the PDAC and NDAC signals to inwardly track the DIFF signal more quickly (i.e., upon every transition of the POSCOMP signal), it may be desirable to use the aggressive update controller 210 to control the PDAC 110 and NDAC 118 for an interval following an AOA_TO_DAC event, as will be illustrated by the waveforms of FIG. 11. It will be appreciated by those of ordinary skill in the art however that a single update controller 206 or 210 may be used to control the PDAC and NDAC counters under all operating conditions.

It will also be appreciated that other schemes are possible to update the PDAC and NDAC signals and thus also the switching threshold signal(s) to remain at a desired percentage of the peak-to-peak DIFF signal. Examples of alternative update schemes are described in the above-referenced U.S. Pat. No. 6,525,531.

Figure 8:
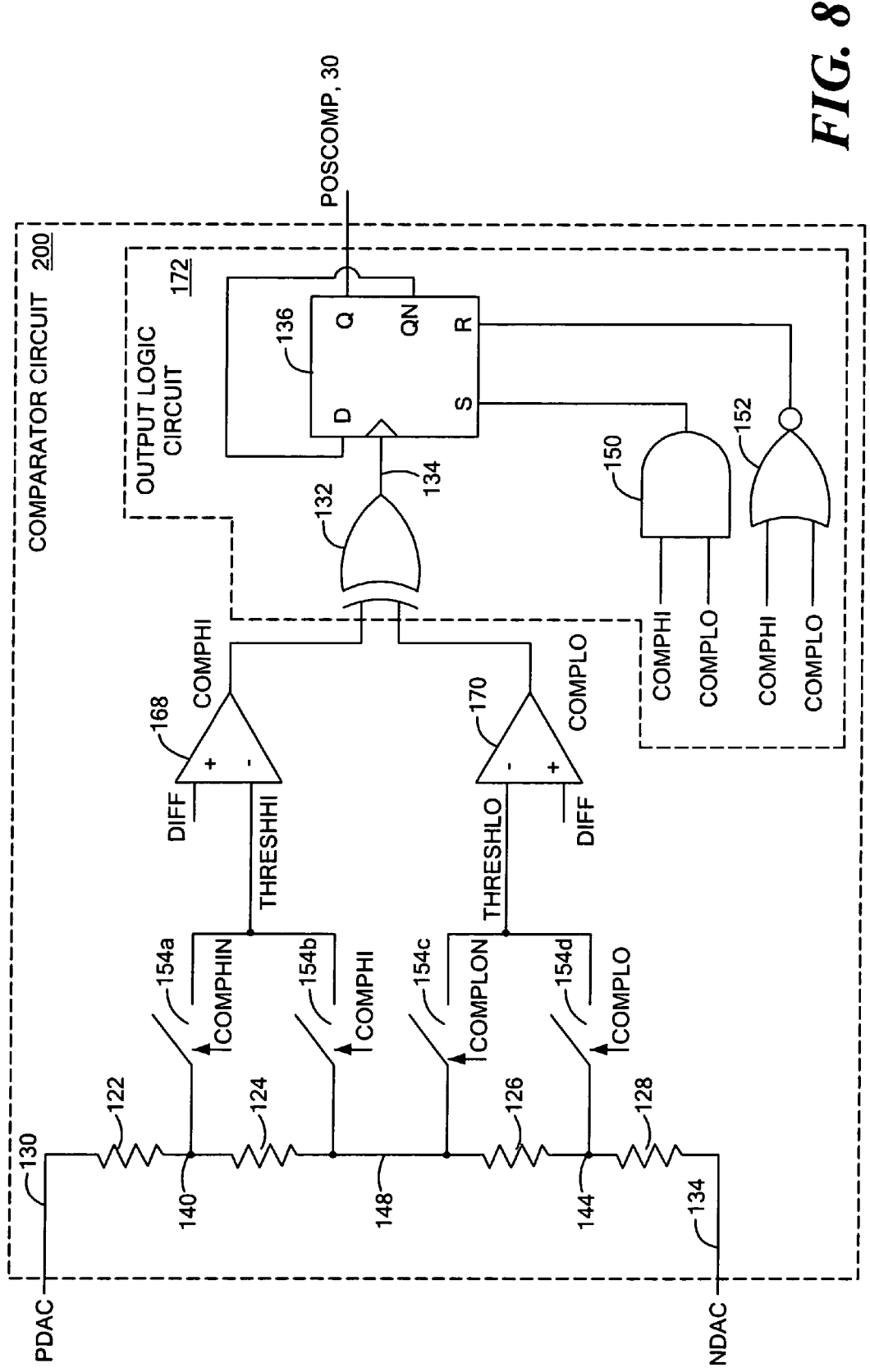
FIG. 8 is a block diagram of the comparator circuit of the detector of FIG. 1.
Figure 9:
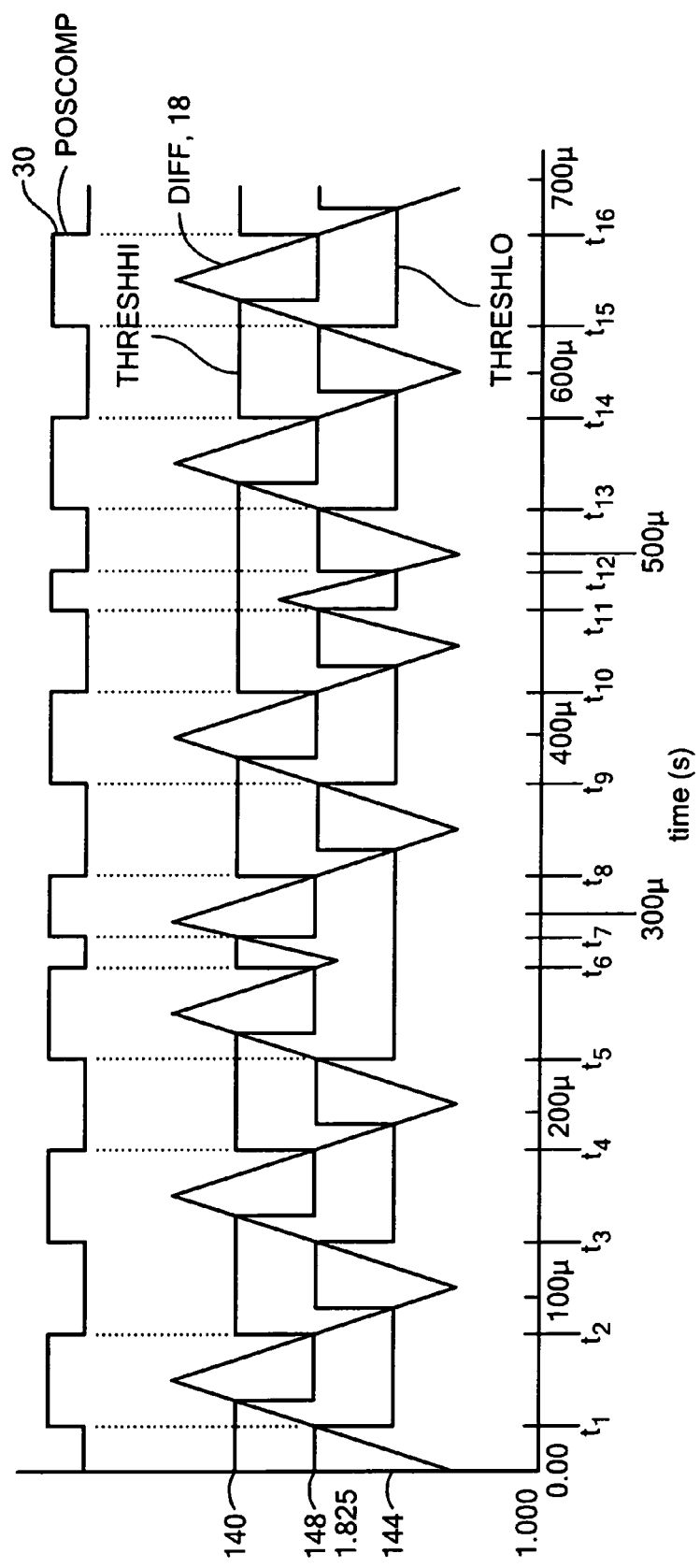
FIG. 9 shows an illustrative DIFF signal and switching threshold signals associated with the detector of FIG. 1 along with the resulting POSCOMP signal.

Referring to FIG. 8, the comparator circuit 200 is shown in greater detail. As noted above, the PDAC signal 130 and the NDAC signal 134 are coupled to resistors 122, 124, 126, and 128 with which signals 140, 148, and 144 are generated at three different percentages of the peak-to-peak DIFF signal. In one illustrative embodiment, an upper threshold signal level 140 is at approximately 75% of the peak-to-peak DIFF signal, a second, center threshold signal level 148 is at approximately 50% of the peak-to-peak DIFF signal, and a third, lower threshold signal level 144 is at approximately 25% of the peak-to-peak DIFF signal. Switches 154a–154d are arranged and controlled so as to apply one of the three threshold levels to comparators 168 and 170, as shown. More particularly, switch 154a is controlled by an inverted version of the COMPHI output signal of comparator 168, or signal COMPHIN, and switch 154b is controlled by the COMPHI signal. With this arrangement, depending on the state of the COMPHI signal, either the upper threshold level or the center threshold level is applied to the inverting input of comparator 168 as the switching threshold signal THRESHHI for comparison to the DIFF signal to provide the COMPHI signal. Similarly, switch 154c is controlled by an inverted version of the COMPLO output signal of comparator 170, or signal COMPLON, and switch 154d is controlled by the COMPLO signal. With this arrangement, depending on the state of the COMPLO signal, either the center threshold level or the lower threshold level is applied to the inverting input of comparator 170 as the switching threshold signal THRESHLO for comparison to the DIFF signal to provide the COMPLO signal.

The output logic circuit 172 includes an exclusive-OR (XOR) gate 132 that is responsive to the COMPHI and to the COMPLO signals to provide a signal 134 to the clock input of a D flip-flop 136, as shown. The D input to the flip-flop 136 is coupled to the QN output as shown and the POSCOMP signal 30 is provided at the Q output. The set input to the flip-flop 136 is controlled by an AND gate 150 that is responsive to the COMPHI and to the COMPLO signals and the reset input of the flip-flop 136 is controlled by a NOR gate 152 that is responsive to the COMPHI and to the COMPLO signals, as shown.

The hysteresis operation of the detector 10 as provided by the comparator circuit 200 will be described in conjunction with FIG. 9. FIG. 9 shows an illustrative DIFF signal 18 in relation to the THRESHHI signal and the THRESHLO signal. The resulting detector output signal, or POSCOMP signal 30 is also shown in FIG. 9.

In operation, if the DIFF signal 18 passes through an outer threshold level 140 or 144 (i.e., meets the outer threshold criteria), then the respective switching threshold signal, THRESHHI and THRESHLO, is set to the center threshold level 148, here at 50% of the peak-to-peak DIFF signal. For example, when the DIFF signal passes through the upper threshold level 140 in the direction from low to high, the switch 154b is closed to set the THRESHHI signal to the center threshold level 148 and when the DIFF signal passes through the lower threshold level 144 in the direction from high to low, switch 154c is closed to set the THRESHLO signal to the center threshold level 148. The POSCOMP signal transitions at the center threshold level 148 when the output of comparator 168 (COMPHI) switches low and when the output of comparator 170 (COMPLO) switches high, here at times t1–t6, t8–t11, t13–t16.

Alternatively, if the DIFF signal 18 does not cross an outer threshold signal 140, 144, then switches 154a and 154d are closed, thereby setting the THRESHHI signal to upper threshold level 140 and setting the THRESHLO signal to the lower threshold level 144 to provide hysteresis under such DIFF signal conditions. More particularly, when the DIFF signal passes the center threshold 148 in the direction from low to high, switch 154d is closed, thereby setting the THRESHLO signal to the lower threshold level 144, as occurs here at time t11. When the DIFF signal passes through the center threshold 148 in the direction from high to low, the THRESHHI signal is set to the upper threshold signal level 140, as occurs here at time t6. The POSCOMP signal transitions at the hysteresis points (140, 144) instead of the nominal switch point 148 under the following conditions: The POSCOMP signal transitions at the lower threshold level 144 when the output of comparator 168 (COMPHI) is low, POSCOMP is high, and the COMPLO signal switches low (at time t12) and the POSCOMP signal transitions at the upper threshold level 140 when COMPLO is high, POSCOMP is low, and the COMPHI signal switches high (at time t7).

The above-described hysteresis scheme advantageously provides switching at the 50%, or center threshold level, thereby providing higher accuracy switching under normal operating conditions when the outer threshold criteria is met. Whereas, when the DIFF signal does not meet the outer threshold criteria, hysteresis is provided, thereby advantageously providing immunity to noise and vibration.

Figure 10:
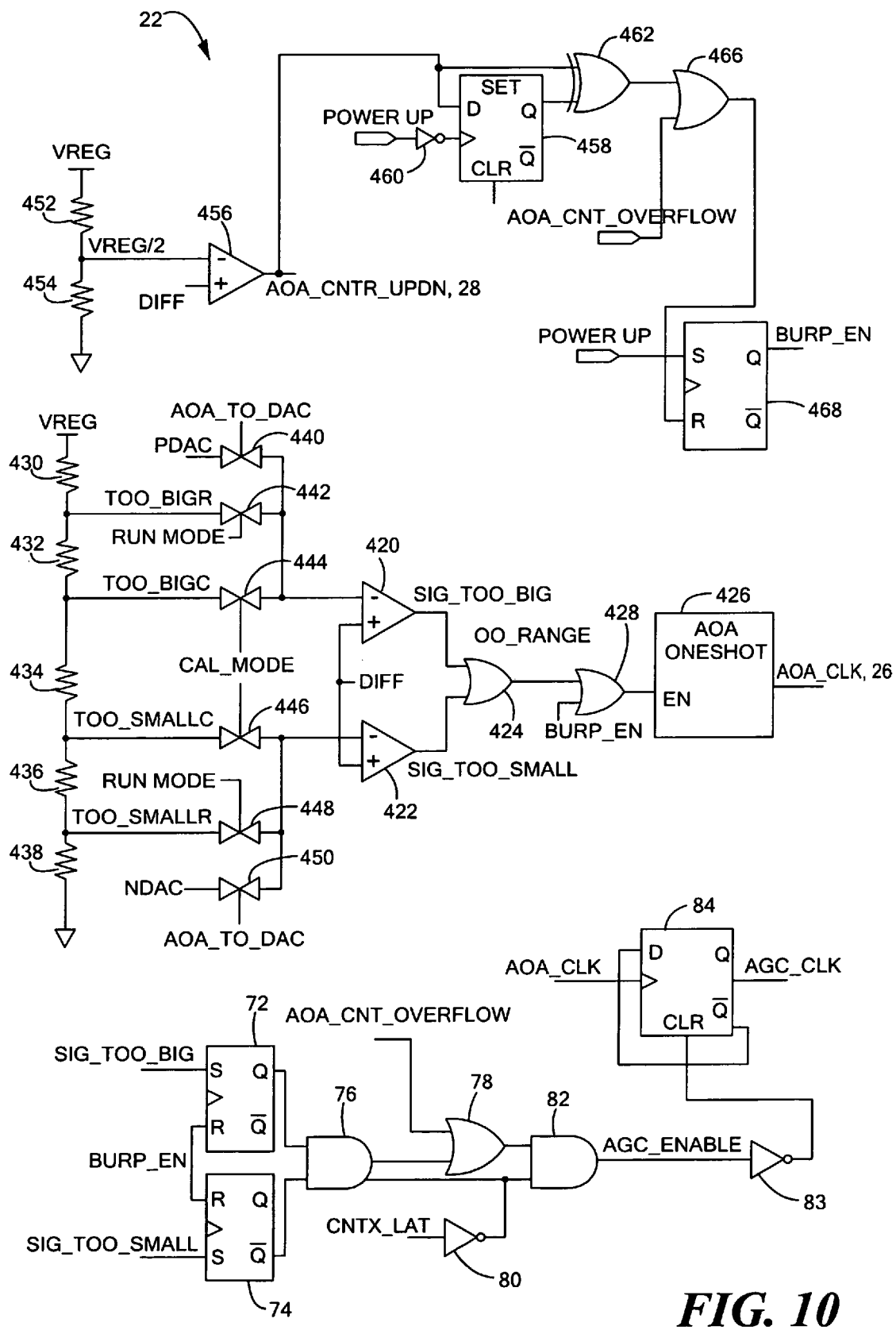
FIG. 10 is a block diagram of the AOA/AGC learn circuit of FIG. 1.

Referring to FIG. 10, the AOA/AGC learn circuit 22 is responsive to the AOA_TO_DAC signal 36 and provides control signals 26, 28 to the counter 20 of the AOA circuit 44 (FIG. 1) and a control signal 32 to the AGC counter 70 (FIG. 1). Specifically, the circuit 22 provides a clock signal, AOA_CLK 26 to counter 20 and a signal AOA_CNTR_UPDN 28 to control the direction of the counter 20. Recall that when the AOA_TO_DAC signal 36 is set, the positive and negative offset threshold signals are switched from respective fixed levels to the level of the PDAC and NDAC signals, respectively, thereby causing the DIFF signal to be clamped to its present level.

The AOA/AGC learn circuit 22 includes a resistor divider including resistors 430, 432, 434, 436, and 438 arranged in series across a Vreg voltage and ground to generate a TOO_BIGR signal, a TOO_BIGC signal, a TOO_SMALLR signal, and a TOO_SMALLC signal, as shown, where the "R" at the end of a signal name denotes use during the running mode of operation and the "C" at the end of a signal name denotes use during the calibration mode of operation. In one illustrative embodiment in which the Vreg voltage is approximately 3.5 volts, the TOO_BIGR signal has a nominal voltage of 2.75 volts, the TOO_BIGC signal has a nominal voltage of 2.25 volts, the TOO_SMALLR signal has a nominal voltage of 1.25 volts, and the TOO_SMALLC signal has a nominal voltage of 0.75 volts. Each of the signals TOO_BIGR, TOO_BIGC, TOO_SMALLR, and TOO_SMALLC is coupled to a respective switch 442, 444, 446, and 448, as shown. The PDAC signal 130 and the NDAC signal 134 are coupled to respective switches 440 and 450, as shown.

Each of switches 440–450 is further coupled to an input of a comparator 420, 422. Specifically, switches 440, 442, and 444 are coupled to the inverting input of a comparator 420 and switches 446, 448, and 450 are coupled to the inverting input of comparator 422. The non-inverting input of each of comparators 420, 422 is coupled to the DIFF signal 18. The output of comparator 420 provides a SIG_TOO_BIG signal and the output of comparator 422 provides a SIG_TOO_SMALL signal, both of which are further coupled to an OR gate 424. Gate 424 provides a OO_RANGE signal to an OR gate 428, as shown. The second input to OR gate 428 is provided by a BURP_EN signal described below. In general, the one-shot 426 is enabled to provide the AOA_CLK signal 26 when the detector is in the start up mode of operation or when the OO_RANGE signal is high.

Switches 442 and 448 are controlled by a RUN_MODE signal, that is substantially the same as the CNTX_LAT signal, so that during the running mode of operation, these switches are closed to couple the TOO_BIGR and TOO_SMALLR signals to inputs of comparators 420 and 422. Switches 444 and 446 are controlled by a CAL_MODE signal, that is substantially the same as an inverted version of the CNTX_LAT signal, so that, during the calibration mode, these switches are closed to couple the TOO_BIGC and TOO_SMALLC signals to inputs of comparators 420 and 422. Switches 440 and 450 are controlled by the AOA_TO_DAC signal 36 so that, in response to an AOA_TO_DAC event, these switches are closed to couple the PDAC and NDAC signals to inputs of comparators 420 and 422. Control signals AOA_TO_DAC, RUN_MODE, and CAL_MODE are mutually exclusive in the sense that only one such signal is high to close the respective switches at any given time.

The AOA/AGC learn circuit 22 includes a further resistor divider including resistors 452 and 454 which provide a reference voltage to the inverting input of a comparator 456, here at a voltage level of one-half of the Vreg voltage. This reference voltage is compared to the DIFF signal to provide the AOA_CNTR_UPDN signal 28, that is coupled to the counter 20 (FIG. 1). Thus, in the illustrative embodiment, if the DIFF signal 18 is greater than approximately 1.75 volts (i.e., Vreg/2), then the AOA_CNTR_UPDN signal 28 is at a logic high level and if the DIFF signal 18 is less than approximately 1.75 volts, then the AOA_CNTR_UPDN signal 28 is at a logic low level. Here, logic high AOA_CNTR_UPDN signal 28 causes the counter 20 to count up and a logic low AOA_CNTR_UPDN signal 28 causes the counter 20 to count down.

The AOA_CNTR_UPDN signal 28 is further coupled to a flip-flop 458 that is clocked by an inverted version of a POWERUP signal as provided by inverter 460. The POWERUP signal is a pulse of predetermined duration occurring after the detector is powered up. The AOA_CNTR_UPDN signal 28 is further coupled to an exclusive OR (XOR) gate 462. The flip-flop 458 latches the state of the comparator 456 at power up so that the output of the XOR gate 462 provides an indication of whether the level of the DIFF signal relative to the Vreg/2 has changed since power up. The output of XOR gate 462 is coupled to an input of an OR gate 466, the second input of which is responsive to an AOA_CNT_OVERFLOW signal that is high when the AOA counter 70 (FIG. 1) is at its highest count value, meaning that no more offset steps are possible. Thus, the output of OR gate 466 is high when either AOA counter 70 has run out of range or when the DIFF signal has crossed through Vreg/2. The output of OR gate 466 resets a latch 468 which is set by the POWERUP signal, as shown. The output of latch 468 provides a BURP_EN signal that is high when the detector 10 is in the start up mode of operation.

AOA events can occur during the three modes of detector operation: during the startup mode, the AOA one-shot 426 is free running until the DIFF signal crosses the Vreg/2 voltage level or the AOA counter 20 (FIG. 1) runs out of range; during the calibration mode where AOA steps occur in response to the TOO_BIGC/TOO_SMALLC levels; and during the running mode where AOA steps occur in response to the TOO_BIGR/TOO_SMALLR levels or alternatively where an AOA_TO_DAC event occurs.

More particularly, in operation, during the startup mode, the AOA counter 20 (FIG. 1) steps continuously until the DIFF signal is shifted past the center of its dynamic range (or runs out of AOA range), in an effort to center the DIFF signal. During the calibration mode, switches 444 and 446 are closed and comparators 420 and 422 compare the DIFF signal 18 to the tighter offset threshold levels of TOO_BIGC and TOO_SMALLC. If the DIFF signal exceeds either of these offset threshold levels, then the output of OR gate 424 goes high to enable the one shot 426, thereby causing the AOA counter 20 (FIG. 1) to be clocked. If it is the TOO_BIGC signal level that is exceeded by the DIFF signal, then the DIFF signal is greater than Vreg/2 and the AOA_CNTR_UPDN signal 28 will be high, thereby causing the counter 20 to count up so as to make the current I more positive and decrease the DIFF signal. This process will continue until the positive peaks of the DIFF signal are less than the TOO_BIGC signal level. Whereas if it is the TOO_SMALLC signal level that is exceeded by the DIFF signal, then the DIFF signal is less than Vreg/2 and the AOA_CNTR_UPDN signal 28 will be low, thereby causing the counter 20 to count down so as to make the current more negative and increase the DIFF signal. This process will continue until the negative peaks of the DIFF signal are greater than the TOO_SMALLC signal level. In this way, during the calibration mode operation, the DIFF signal is clamped to the levels of the TOO_SMALLC signal and the TOO_BIGC signal.

When an AOA_TO_DAC event occurs and the AOA_TO_DAC signal 36 goes high, switches 440 and 450 are closed and comparators 420 and 422 compare the DIFF signal 18 to the PDAC signal 130 and the NDAC signal 134, respectively. If the DIFF signal exceeds either of the PDAC signal or the NDAC signal, then the output of OR gate 424 goes high to enable the one shot 426, thereby causing the AOA counter 20 (FIG. 1) to be clocked. If it is the PDAC signal level that is exceeded by the DIFF signal, then the DIFF signal is greater than Vreg/2 and the AOA_CNTR_UPDN signal 28 will be high, thereby causing the counter 20 to count up so as to increase the current I and decrease the DIFF signal. This process will continue until the positive peaks of the DIFF signal are less than the PDAC signal. Whereas if it is the NDAC signal level that is exceeded by the DIFF signal, then the DIFF signal is less than Vreg/2 and the AOA_CNTR_UPDN signal 28 will be low, thereby causing the counter 20 to count down so as to decrease the current I and increase the DIFF signal. This process will continue until the negative peaks of the DIFF signal are greater than the NDAC signal level. In this way, if an AOA_TO_DAC event occurs during the running mode of operation, the offset threshold signals coupled to the comparators 420, 422 are switched from their fixed TOO_BIGC and TOO_SMALLC signal levels to the PDAC and NDAC signal levels, respectively, and the DIFF signal is thereby clamped to its present level.

Finally, during normal running mode operation, switches 442 and 448 are closed and comparators 420 and 422 compare the DIFF signal 18 to the looser offset threshold levels of TOO_BIGR and TOO_SMALLR. If the DIFF signal exceeds either of these offset threshold levels, then the output of OR gate 424 goes high to enable the one shot 426, thereby causing the AOA counter 20 (FIG. 1) to be clocked. If it is the TOO_BIGR signal level that is exceeded by the DIFF signal, then the DIFF signal is greater than Vreg/2 and the AOA_CNTR_UPDN signal 28 will be high, thereby causing the counter 20 to count up so as to increase the current I and decrease the DIFF signal. This process will continue until the positive peaks of the DIFF signal are less than the TOO_BIGR signal level. Whereas if it is the TOO_SMALLR signal level that is exceeded by the DIFF signal, then the DIFF signal is less than Vreg/2 and the AOA_CNTR_UPDN signal 28 will be low, thereby causing the counter 20 to count down so as to decrease the current I and increase the DIFF signal. This process will continue until the negative peaks of the DIFF signal are greater than the TOO_SMALLR signal level. In this way, during normal running mode operation, the DIFF signal is clamped to the levels of the TOO_SMALLR signal and the TOO_BIGR signal.

The AOA/AGC learn circuit 22 includes AGC circuitry including latches 72, 74, and 84, gates 76, 78, 82, and an inverter 80, coupled as shown. The AOA_CLK signal 26 provides the clock input to latch 84, as shown. The latch 84 is cleared by an AGC_ENABLE signal as follows. Latches 72 and 74 are set in response to the DIFF signal exceeding one of the current offset threshold signal levels (whether it be the TOO_BIGR and TOO_SMALLR signals during the running mode, the TOO_BIGC and TOO_SMALLC signals during start up, or the PDAC and NDAC signals following an AOA_TO_DAC event). The reset input to the latches 72 and 74 are provided by the BURP_EN signal such that the latches 72, 74 are locked out during the start up mode of operation so that the DIFF signal has to cross the TOO_BIGC and TOO_SMALLC signals after it has been centered during the start up mode in order to cause an AGC step.

If both of the SIG_TOO_BIG signal and the SIG_TOO_SMALL signal are high (meaning that the DIFF signal has exceeded both the positive offset threshold signal level and the negative offset threshold signal level), then the output of AND gate 76 goes high, thereby causing the output of OR gate 78 to go high. Another condition that can cause the output of OR gate 78 to go high is the AOA_CNT_OVERFLOW signal being high, as occurs when the AOA counter 70 (FIG. 1) is at its highest count value, meaning that no more offset steps are possible. If the CNTX_LAT signal is low, meaning that the detector is in calibration mode, when the output of OR gate 78 is high, then the output of AND gate 82, the AGC_ENABLE signal, will be high. Otherwise, the AGC_ENABLE signal is low, causing the latch 84 to be reset since the output of inverter 83 will be high. In this way, the latch 84 is cleared at CNTX_LAT to disable further AGC movement.

In operation of the AGC circuit 56 (FIG. 1), the resistance of element 64 is initially set to provide a maximum gain. According to the logic circuitry described above, the AGC counter 70 is enabled as long as the DIFF signal is greater than the offset threshold signal levels and the AGC counter 70 is not at its maximum count value and the detector is in the calibration mode of operation. The incremented counter output is provided to a resistor control circuit for adjusting the resistor 64 in a manner that causes the magnitude of the DIFF signal 18 to be reduced.

Referring to the waveforms of FIG. 11, an illustrative magnetic field signal 16 experiences a significant offset drift at approximately time t=2 ms. Likewise at time t=2 ms, the DIFF signal 18 increases and the PDAC signal 130 also increases in an effort to track the rising DIFF signal. Each increment of the PDAC counter 106 causes the AOA offset counter 216 (FIG. 2A) to count and by approximately time t=2.08 ms, the counter has reached the predetermined value, thereby causing the AOA_TO_DAC signal 36 to transition, as shown.

For simplicity of illustration, a single switching threshold signal Vsw is shown in FIG. 11. In the context of the detector 10 in which hysteresis is achieved in the manner described above in conjunction with FIGS. 8 and 9, it will be appreciated that the switching threshold signal Vsw is a combination of the THRESHHI and THRESHLO signals (as selected by switches 154a, 154b, 154c, and 154d), whereby at any given time the switching threshold signal Vsw is provided by the one of the THRESHHI and THRESHLO signals that causes the POSCOMP signal to switch.

The transition from the calibration mode to the running mode occurs at approximately time t=1.3 ms, corresponding to a jump in the positive and negative offset threshold signals from their calibration mode fixed levels (i.e., TOO_BIGC and TOO_SMALLC) to the more relaxed running mode fixed levels (i.e., TOO_BIGR and TOO_SMALLR).

As described above, a transition of the AOA_TO_DAC signal 36 initiates an AOA_TO_DAC event, thereby causing the offset threshold signal levels to change from their fixed levels (i.e., from TOO_BIGR and TOO_SMALLR) to the PDAC/NDAC signal levels and the DIFF signal to be clamped to its present levels. More particularly, in response to the AOA_TO_DAC signal 36 going high, switches 440 and 450 close (FIG. 10) and the DIFF signal is thereby clamped to the level of the PDAC signal and the NDAC signal. As is also apparent from FIG. 11, the switching threshold signal Vsw increases as the PDAC signal increases. Adjusting the offset threshold signal levels to the PDAC/NDAC signal levels in this manner causes the DIFF signal 18 to be clamped to its present level, thereby clamping the PDAC and NDAC signal levels to levels suitable to ensure that the detector output signal 30 will switch even under conditions of relatively low magnetic field signal magnitude and significant offset shift.

At approximately time=2.3 ms, the AGGR_UPDATE signal (FIG. 2A) goes high as occurs on the first POSCOMP signal transition following the AOA_TO_DAC signal 36 going high as described above in conjunction with FIG. 2A. This signal transition causes the aggressive update controller 210 output signals p_hold2, p_updn2, n_hold2, and n_updn2 to govern the PDAC counter 106 and the NDAC counter 114, as discussed above.

Once the AGGR_UPDATE signal goes low, at approximately time t=2.65 ms, the conservative update controller 208 again controls the p_hold1, p_updn1, n_hold1, and n_updn1 to govern the PDAC counter 106 and the NDAC counter 114. Recall that the AGGR_UPDATE signal goes low after a predetermined number of gear teeth pass as determined by the PC_CNT3 signal provided by counter 196 (FIG. 2A). With this arrangement, the aggressive update controller 210 causes the PDAC and NDAC signals to quickly track the DIFF signal following an AOA_TO_DAC event.

Also shown in FIG. 11 is the AOA state that represents the value at the output of counter 20. As is apparent, the output of counter 20 decreases starting at time 2.08 ms until the AOA_CLK signal 26 remains low at approximately time t=2.18 ms.

All references cited herein are hereby incorporated herein by reference in their entirety.

Having described preferred embodiments of the invention, it will now become apparent to one of ordinary skill in the art that other embodiments incorporating their concepts may be used. For example, it will be appreciated by those of ordinary skill in the art that the apparatus and methods described herein could be utilized in various types of sensing applications in which a signal is subject to drift over time and/or temperature.

It is felt therefore that these embodiments should not be limited to disclosed embodiments, but rather should be limited only by the spirit and scope of the appended claims.

What is claimed is:

1. Apparatus for detecting passing magnetic articles and providing a detector output signal indicative of the passing magnetic articles comprising:
    a magnetic field sensor providing a magnetic field signal proportional to an ambient magnetic field;
    an offset adjustment circuit responsive to the magnetic field signal for adjusting an offset of the magnetic field signal based on a dynamically adjustable offset threshold signal to provide an offset-adjusted signal;
    a Positive Digital-to-Analog converter (PDAC) operative to provide a PDAC signal that tracks positive peaks of the offset-adjusted signal;
    a Negative Digital-to-Analog converter (NDAC) operative to provide an NDAC signal that tracks negative peaks of the offset-adjusted signal; and
    a comparator responsive to the offset-adjusted signal and a switching threshold signal to provide the detector output signal, wherein the switching threshold signal is a percentage of the difference between the PDAC signal and the NDAC signal.

2. The apparatus of claim 1 further comprising an update controller operative to increase the PDAC signal in response to increasing positive peaks of the offset-adjusted signal and to decrease the PDAC signal in response to a predetermined number of positive peaks of the offset-adjusted signal occurring that are less than a positive update threshold signal and wherein the update controller is further operative to decrease the NDAC signal in response to decreasing negative peaks of the offset-adjusted signal and to increase the NDAC signal in response to a predetermined number of negative peaks of the offset-adjusted signal occurring that are greater than a negative update threshold signal.

3. The apparatus of claim 2 wherein the offset threshold signal is adjusted from a first, fixed level to a second level after an occurrence of a predetermined increase in the PDAC signal or a predetermined decrease in the NDAC signal.

4. The apparatus of claim 3 wherein the occurrence is established by a counter responsive to increases of the PDAC signal and decreases of the NDAC signal.

5. The apparatus of claim 3 wherein the offset threshold signal comprises a positive offset threshold signal and a negative offset threshold signal and wherein, when the offset threshold signal is at the second level, the positive offset threshold signal is substantially equal to the PDAC signal and the negative offset threshold signal is substantially equal to the NDAC signal.

6. The apparatus of claim 3 further comprising a second update controller operative to increase the PDAC signal in response to increasing positive peaks of the offset-adjusted signal and to decrease the PDAC signal to the level of the offset-adjusted signal in response to transitions of the detector output signal of a first polarity and wherein the second update controller is further operative to decrease the NDAC signal in response to decreasing negative peaks of the offset-adjusted signal and to increase the NDAC signal to the level of the offset-adjusted signal in response to transitions of the detector output signal of a second, opposite polarity.

7. The apparatus of claim 6 wherein the second update controller controls the PDAC and the NDAC for an interval following an adjustment of the offset threshold signal.

8. A method for detecting passing magnetic articles by comparing a magnetic field sensor signal proportional to an ambient magnetic field to a switching threshold signal, comprising:
    adjusting a DC offset of the magnetic field sensor signal based on a dynamically adjustable offset threshold signal to provide an offset-adjusted signal;
    generating a PDAC signal that tracks positive peaks of the offset-adjusted signal;
    generating an NDAC signal that tracks negative peaks of the offset-adjusted signal;
    providing a switching threshold signal as a percentage of the difference between the PDAC signal and the NDAC signal;
    comparing the switching threshold signal to the offset-adjusted signal to provide a detector output signal.

9. The method of claim 8 further comprising:
    increasing the PDAC signal in response to increasing positive peaks of the offset-adjusted signal;
    decreasing the PDAC signal in response to a predetermined number of positive peaks of the offset-adjusted signal being less than a positive update threshold signal;
    decreasing the NDAC signal in response to decreasing negative peaks of the offset-adjusted signal; and
    increasing the NDAC signal in response to a predetermined number of negative peaks of the offset-adjusted signal being greater than a negative update threshold signal.

10. The method of claim 9 wherein the adjustable offset threshold signal is adjusted from a first, fixed level to a second level after an occurrence of a predetermined increase of the PDAC signal or a predetermined decrease of the NDAC signal.

11. The method of claim 10 including establishing the occurrence with a counter that counts increases of the PDAC signal and decreases of the NDAC signal.

12. The method of claim 11 including providing the adjustable offset threshold signal in the form of a positive offset threshold signal and a negative offset threshold signal and wherein, when the offset threshold signal is at the second level, the positive offset threshold signal is substantially equal to the PDAC signal and the negative offset threshold signal is substantially equal to the NDAC signal.

* * * * *

UNITED STATES PATENT AND TRADEMARK OFFICE
CERTIFICATE OF CORRECTION

| | |
|---|---|
| PATENT NO. | : 7,138,793 B1 |
| APPLICATION NO. | : 11/405265 |
| DATED | : November 21, 2006 |
| INVENTOR(S) | : Bailey |

It is certified that error appears in the above-identified patent and that said Letters Patent is hereby corrected as shown below:

Column 1, line 53, delete "sometime" and replace with -- sometimes --.

Column 7, line 66, delete "restore accuracy the accuracy of" and replace with -- restore the accuracy of --.

Column 9, line 59, delete "trigger and" and replace with -- trigger an --.

Column 14, line 52, delete "in order avoid" and replace with -- in order to avoid --.

Signed and Sealed this

First Day of May, 2007

JON W. DUDAS
*Director of the United States Patent and Trademark Office*